United States Patent
Varadi

(10) Patent No.: US 9,857,779 B2
(45) Date of Patent: Jan. 2, 2018

(54) MULTI-DIMENSIONAL OPTIMIZATION FOR CONTROLLING ENVIRONMENTAL MAINTENANCE MODULES

(71) Applicant: Vigilent Corporation, Oakland, CA (US)

(72) Inventor: Peter Christian Varadi, El Cerrito, CA (US)

(73) Assignee: Vigilent Corporation, Oakland, CA (US)

(*) Notice: Subject to any disclaimer, the term of this patent is extended or adjusted under 35 U.S.C. 154(b) by 698 days.

(21) Appl. No.: 14/473,693

(22) Filed: Aug. 29, 2014

(65) Prior Publication Data

US 2014/0371920 A1 Dec. 18, 2014

Related U.S. Application Data

(63) Continuation of application No. PCT/US2013/028596, filed on Mar. 1, 2013.
(Continued)

(51) Int. Cl.
*G05B 13/04* (2006.01)
*G05D 23/20* (2006.01)
(Continued)

(52) U.S. Cl.
CPC ........ *G05B 13/048* (2013.01); *F24F 11/0009* (2013.01); *G05D 23/19* (2013.01);
(Continued)

(58) Field of Classification Search
None
See application file for complete search history.

(56) References Cited

U.S. PATENT DOCUMENTS

| 6,264,111 B1 | 7/2001 | Nicolson | |
|---|---|---|---|
| 2009/0281641 A1* | 11/2009 | Fuller | G05B 13/04 700/30 |

(Continued)

FOREIGN PATENT DOCUMENTS

| EP | 2413206 A1 | 2/2012 |
|---|---|---|
| JP | 58-040607 S | 9/1983 |

(Continued)

OTHER PUBLICATIONS

International Search Report and Written Opinion dated Jul. 4, 2013 in PCT/US2013/028596, 6 pages.
(Continued)

*Primary Examiner* — Qing Wu
(74) *Attorney, Agent, or Firm* — Kilpatrick Townsend & Stockton LLP; David B. Raczkowski

(57) ABSTRACT

Methods, systems, and apparatuses are provided for controlling an environmental maintenance system that includes a plurality of sensors and a plurality of actuators. The operation levels of the actuators can be determined by optimizing a cost function subject to a constraint, e.g., having no more than a certain number of sensors that are out of range. A predictor model can predict whether certain operation levels of the actuators violate the constraint. The search for acceptable operation levels (i.e., ones that do not violate constraints) can be performed by analyzing points on lines in an N-dimensional space, where N is the number of actuators. The subset of acceptable operation levels along with a cost function (e.g., that incorporates energy consumption information) can be used to change operation levels of the modules to keep the temperatures within a desired range while using minimal energy.

27 Claims, 13 Drawing Sheets

Related U.S. Application Data

(60) Provisional application No. 61/606,345, filed on Mar. 2, 2012.

(51) Int. Cl.
  *G05D 23/19*   (2006.01)
  *F24F 11/00*   (2006.01)
  *G05D 23/00*   (2006.01)
  *G06Q 10/04*   (2012.01)

(52) U.S. Cl.
  CPC ............ *G05D 23/20* (2013.01); *G05D 23/00* (2013.01); *G06Q 10/04* (2013.01)

(56) References Cited

U.S. PATENT DOCUMENTS

| | | |
|---|---|---|
| 2011/0036108 A1 | 2/2011 | Seem |
| 2011/0077783 A1 | 3/2011 | Karpman |
| 2013/0308674 A1* | 11/2013 | Kramer ................ G01K 15/005 374/1 |

FOREIGN PATENT DOCUMENTS

| | | |
|---|---|---|
| JP | 2005-316738 A | 11/2005 |
| WO | 2009/086220 A1 | 7/2009 |
| WO | 2009086220 A1 | 7/2009 |
| WO | 2011/072332 A1 | 6/2011 |
| WO | 2012024692 A1 | 2/2012 |

OTHER PUBLICATIONS

Extended European Search Report dated Dec. 4, 2015 in EP 13 75 4468.0, 4 pages.
Extended European Search Report dated Dec. 4, 2015 in PCT/US2013/028596, 4 pages.

* cited by examiner

MULTI-DIMENSIONAL OPTIMIZATION FOR CONTROLLING ENVIRONMENTAL MAINTENANCE MODULES

CROSS-REFERENCES TO RELATED APPLICATIONS

The present application is a continuation of International Application No. PCT/US2013/028596, entitled "MULTI-DIMENSIONAL OPTIMIZATION FOR CONTROLLING ENVIRONMENTAL MAINTENANCE MODULES" filed Mar. 1, 2013, which claims priority from U.S. Provisional Application No. 61/606,345, entitled "MULTI-DIMENSIONAL OPTIMIZATION FOR CONTROLLING ENVIRONMENTAL MAINTENANCE MODULES" filed Mar. 2, 2012, the entire contents of which are herein incorporated by reference for all purposes.

The present application is related to commonly owned non-provisional applications: Ser. No. 13/215,189 entitled "ENERGY-OPTIMAL CONTROL DECISIONS FOR SYSTEMS" by Federspiel et al. filed Aug. 22, 2011; Ser. No. 12/860,820 entitled "Method And Apparatus For Efficiently Coordinating Data Center Cooling Units" by Federspiel et al. filed Aug. 20, 2010; and Ser. No. 12/396,944 entitled "Method and Apparatus for Coordinating the Control of HVAC Units" by C. Federspiel filed Mar. 3, 2009, the entire contents of which are herein incorporated by reference for all purposes.

BACKGROUND

The present disclosure generally relates to environmental control systems, such as heating, ventilation, and air conditioning (HVAC) systems, which can be used to control the temperature and humidity of common spaces, e.g., as can exist in data centers containing server computers. More, specifically the present disclosure relates to an optimization method for determining a change to the operation levels of actuators of the environmental control system.

Modern datacenters use HVAC or computer room air conditioner (CRAC) systems to control indoor temperature, humidity, and other variables. It is common to have many HVAC units deployed throughout a data center. They are often floor-standing units, but may be wall-mounted, rack-mounted, or ceiling-mounted. The HVAC units also often provide cooled air either to a raised-floor plenum, to a network of air ducts, or to the open air of the data center. The data center itself, or a large section of a large data center, typically has an open-plan construction, i.e. no permanent partitions separating the air in one part of the data center from the air in another part. Thus, in many cases, these data centers have a common space that is temperature-controlled and humidity-controlled by multiple HVAC units.

HVAC units for data centers are typically operated with decentralized, stand-alone controls. It is common for each unit to operate in an attempt to control the temperature and humidity of the air entering the unit from the data center. For example, an HVAC unit may contain a sensor that determines the temperature and humidity of the air entering the unit. Based on the measurements of this sensor, the controls of that HVAC will alter operation of the unit in an attempt to change the temperature and humidity of the air entering the unit to align with the set points for that unit.

For reliability, most data centers are designed with an excess number of HVAC units. Since the open-plan construction allows free flow of air throughout the data center, the operation of one unit can be coupled to the operation of another unit. The excess units and the fact that they deliver air to substantially overlapping areas provides a redundancy, which ensures that if a single unit fails, the data center equipment (servers, routers, etc.) will still have adequate cooling to maintain the temperature within a desired set point.

As mentioned above, the standard operating procedure for the HVAC units is to control the return air temperature into each HVAC unit. Such operation is not aware of the temperature of the air entering the servers and other computing equipment in the data center. Since this information is not available to the HVAC unit controls or to the data center operators, the extra HVAC units are typically run at all times, to ensure that the servers are kept cool. However, such precautionary measures waste energy.

While it is possible to manually turn off redundant HVAC units to save energy, doing so poses a risk of overheating that equipment. Also, some data centers have variable loads, in which case it may be necessary to stop and start several units throughout the day. Furthermore, the complex and tightly coupled airflow patterns in a data center make it difficult for an operator to know which HVAC unit will be the most effective to restart should a need be identified.

Additionally, current methods ignore the cost (e.g., energy usage or maintenance) of HVAC units when determining how to control the units. U.S. application Ser. No. 13/215,189 describes methods for incorporating costs of operating an environmental maintenance system to determine optimal operation levels of the actuators of the system. However, the determination of optimal operation levels can be difficult when there are many actuators and/or when there are many operation levels (e.g. many settings) for the actuators. This difficulty is compounded when the sensor values are constrained to be within a desired range.

Nelder-Mead (aka Amoeba) type generic search algorithms are well known and widely used. They comprise a multidimensional geometric simplex and a set of rules for moving and reshaping that simplex through the optimization space. These methods are not well suited for problems with a very large number of constraints and very large-dimensional optimization spaces due to the fact that the algorithm relies on a measure of distance between two points in the optimization space (e.g., a sum of squares of the Cartesian coordinate differences between the two points). When there are very many coordinates (e.g., 100), then the individual contribution of one coordinate difference becomes very small. As a result, small variations in the shape of the Nelder-Mead simplex are difficult to distinguish from each other and the simplexes can quickly degenerate into a nearly zero-volume simplex.

Another optimization method is a pattern search algorithm that uses a multidimensional cross that grows and shrinks as it is moved through the optimization space. The cost at each end of the cross is compared with the cost at the center of the cross to decide where to move the cross next and how to grow/or shrink it. The basic shape does not change unlike the Nelder-Mead simplex so that this approach works much better in large-dimensional optimization problems. However, the pattern search is not well suited to problems with a very large number of constraints, especially if these constrains can potentially carve out extremely complicated, and possibly disjoint, subspaces of allowable control value combinations.

Therefore, it is desirable to provide new methods and systems that can determine optimal operation levels for actuators of an environmental maintenance system, e.g., a method that can produce near-optimal solutions to optimization problems that are characterized by a very large number of controls and constraints on controls and sensor values, preferably in a predictable timeframe.

BRIEF SUMMARY

Embodiments of the present invention can provide systems and methods for controlling actuators of environmental maintenance modules (e.g. HVAC units) using sensors. In various embodiments, a system can heat, cool, or light an environment. Sensors can measure temperatures or other state variables (such as humidity, pressure, light) at various locations within the environment. A predictor model can be obtained for predicting how a change in the operation levels of the actuators affects the sensor values. This predictor model can be used to determine changes to the present operation levels of the actuators that are predicted to keep the sensor values (e.g., temperature) within a desired range, or at least having only a certain number that are out of range. The search for acceptable operation levels (i.e., ones that do not violate constraints) can be performed by analyzing points on lines in an N-dimensional space, where N is the number of actuators. The subset of acceptable operation levels along with a cost function (e.g., that incorporates energy consumption information) can be used to change operation levels of the actuators to keep the temperatures within a desired range while using minimal energy.

According to one embodiment, a method controls an environmental maintenance system that includes a plurality of actuators and a plurality of sensors. Each sensor measures a value of a physical condition of an environment. Sensor values S corresponding to the sensors can be received, with a desired range of sensor values for each sensor. Operation levels U of N actuators (N≥2) can be received, where possible values for the operation levels U define an N dimensional space. A cost function C has the operation levels U as an input. A predictor model predicts a change dS in the sensor values for a change dU in the operation levels. A computer system determines an optimal change dU' in the operation levels U of the actuators by identifying N lines in the N-dimensional space, where the N lines span the N-dimensional space. For each of a plurality of points on each line, the predictor model predicts the sensor values for the point, and whether the point violates a constraint of having greater than a specified number of predicted sensor values out of range is determined. The values of the cost function C at candidate points that do not result in a violation of the constraint are determined. The values of the cost function C at the candidate points are used to determine the optimal change dU'. The optimal change dU' is transmitted (e.g., to the actuators, a PID, or a controller) to change the operational levels of the actuators In one embodiment, the plurality of points on each line might violate the constraints. In such an embodiment, a first point that causes the least number of predicted sensor values out of range is determined. The first point is used to determine the optimal change dU', which is transmitted to change the operational levels of the actuators.

Other embodiments of the invention are directed to systems, devices, and computer readable media associated with methods described herein.

A better understanding of the nature and advantages of the present invention may be gained with reference to the following detailed description and the accompanying drawings.

DEFINITIONS

Figure 1:
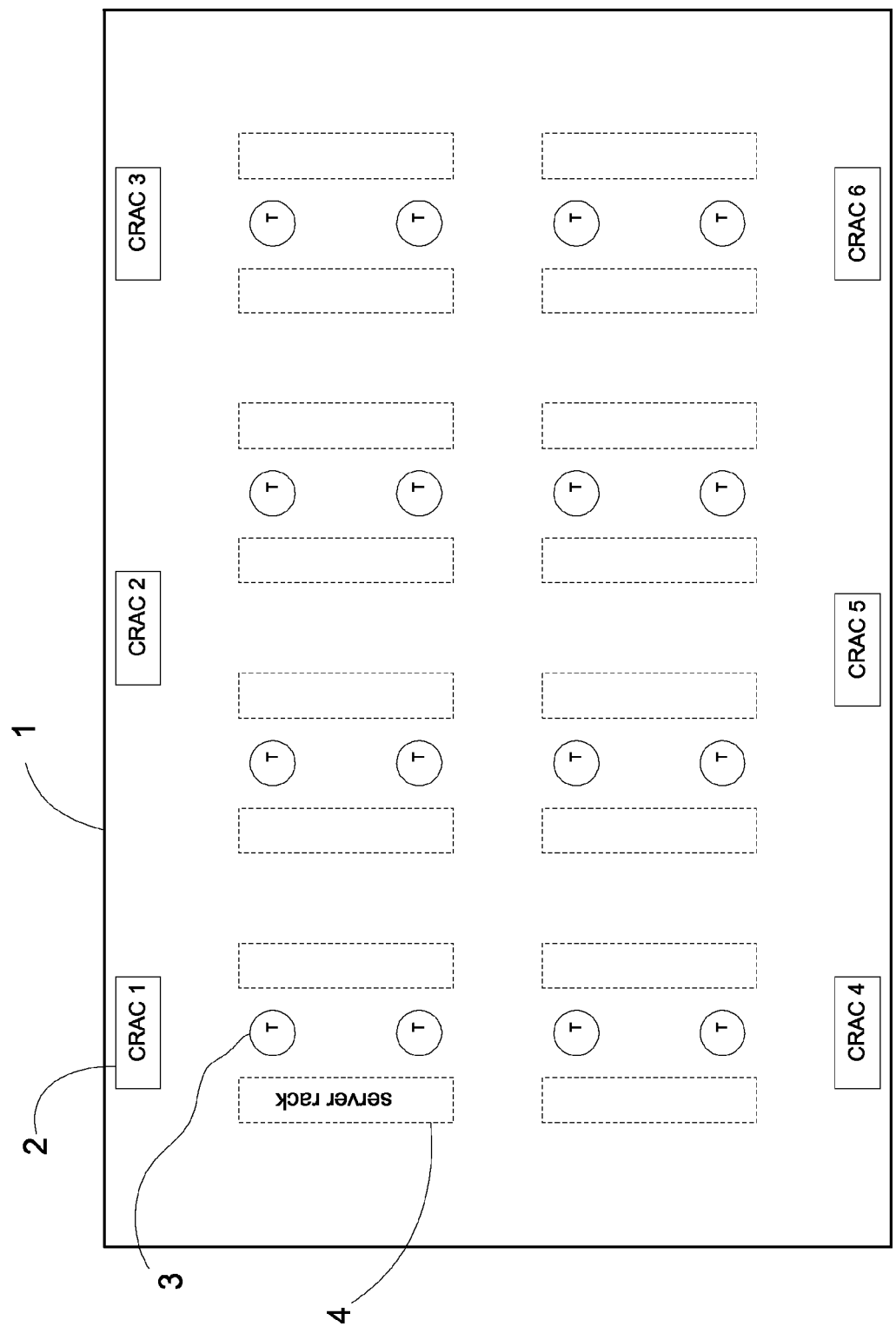
FIG. 1 is a plan view of a data center according to an embodiment of the present invention.

An environmental maintenance module may be an HVAC unit, a computer room air conditioner (CRAC) unit, or any device that receives control signals and provides an output that is designed to achieve or maintain an environmental condition in a specific area. An operation level can be a value of an operational parameter (input or output) that measures how much effort is being expended by a module to perform an operation, such as heating of cooling. Operation levels of a module can include stopped, operating at full power, percentages of input power levels, percentages or values for operation of a particular device within the module (e.g. a fan speed, temperature setpoint, humidity setpoint, or valve position), and percentages or values of the output heating or cooling power of the output air stream, e.g., as compared to a reference level.

The term "optimal" refers to any value that is determined to be numerically better than one or more other values. For example, an optimal value is not necessarily the best possible value, but may simply satisfy a criterion (e.g. a change in a cost function from a previous value is within tolerance). Thus, the optimal solution can be one that is not the very best possible solution, but simply one that is better than another solution according to a criterion. Such an optimal solution encompasses 'near-optimal' solutions. The term 'near-optimal' is used to express the fact that in a large-dimensional optimization problem system with a large number of constraints, the exact global optimum cannot be determined by a brute force search through all possible control value combinations. It is therefore not possible to know if an optimization method produces the true global optimal solution with the lowest associated cost. In practice, however, it is often more important to determine within a reasonable amount of computational time a set of control values that have a preferably much lower predicted total cost than another set. Also, from a practical standpoint, the control values, sensor readings, and the predictor are all encumbered by noise, bias, modeling errors, etc. that may make the mathematically global optimum of the optimization problem not necessarily better than a near-optimal solution when the corresponding control value settings are actually executed. Related to this observation, it suffices for most practical optimization problems to consider only discrete or discretized control values without loss in practical value of the discovered near-optimal solutions.

DETAILED DESCRIPTION

To ensure that an environment (e.g. a data center) is sufficiently cool or warm, standard operating procedure is to operate extra HVAC units or air-handling units (AHUs) (or other environmental maintenance modules) beyond what is marginally required. However, such precautionary measures waste energy. Instead, embodiments can use a control system to determine optimal operation levels of actuators of the environmental maintenance modules.

For example, consider a data center having a multitude of air-handling units (AHUs) and a multitude of temperature sensors distributed throughout that data center (other multi-controls/multi-sensor systems can be optimized). In a data center, large amounts of heat are produced by electric computing equipment. A goal of determining optimal (which includes near-optimal) operation levels for the AHUs can be to maintain sufficiently low air temperatures throughout the data center to protect the heat-sensitive equipment with a minimal cooling effort by the AHUs. AHU cooling effort is typically measured in units of the expended electric power to run an AHU, but other measures such as deferred maintenance cost due to fewer operating hours can be used as well, as is explained below. It is often the case that the cost of running an AHU increases monotonically and non-linearly with a control value for that AHU. For example, an electric fan consumes more power as it is made to spin faster. The terms 'cost' or 'optimization cost' are used to generally refer to the effort to be reduced.

A predictor model (e.g., a transfer matrix or a non-linear function), also called a transfer model, can be used as part of an optimization procedure, e.g., to ensure that certain constraints are not violated (e.g., more than a specified number of sensors being out of range). In one aspect, the transfer model can provide a relation between a change in operation level of a module and resulting differences for each sensor in the system. The transfer model can be used to optimize a cost (penalty) function (which includes one or more terms for the cost of operation) to determine optimal operational levels while keeping the sensor values within range, or at least having only a certain number that are out of range. The predictor model can be updated over time.

To perform the optimization in an N-dimensional space (where N is the number of actuators), embodiments can identify control-value points (i.e. operation levels of the actuators) where the sensors values are within a desired range or at least having only a certain number that are out of range. These "candidate" points (also called valid points) can be obtained by testing points along N lines that span the N-dimensional space (e.g. N mutually orthogonal lines) using the predictor model to determine which of these sampled points satisfy a criteria of less than K sensor values out of range. The valid points can then be used to find optimal points that reduce a cost function for the operation of the system.

In the following description, an overview of example systems for a data center or other applications is provided first. A transfer (predictor) model for predicting resultant sensor values (output) for particular operation levels of the actuators (input values) is then explained. Variations of the cost function are then described. A novel optimization method of finding an optimal change in the operation levels while satisfying constraint criteria is then described.

I. System Overview

FIG. 1 shows a floor plan of a data center according to an embodiment of the present invention. Perimeter wall 1 may be the perimeter wall of a data center or the perimeter wall of a commercial building such as a retail store. A data center includes a plurality of HVAC units 2 (or other environmental maintenance modules), a plurality of environmental sensors 3, and a plurality of server racks 4. As shown, the HVAC units are computer room air conditioner (CRAC) units.

In one embodiment, HVAC units 2 are unitary equipment that provide airflow to the data center to cool servers in server racks 4. In one aspect, HVAC units 2 can cool, heat, humidify, or dehumidify air that passes through them. Environmental sensors 3 are devices that measure environmental parameters, such as temperature or humidity. Environmental sensors 3 can transmit measurements (also called readings) by any means, such as by wired or wireless communication means (e.g., Modbus, BACnet, Wi-Fi, WiMAX, ZigBee, or any other applicable protocol). The HVAC units 2 (and other modules mentioned herein) can be controlled by a computer system with one or more processors to provide specified conditions within the data center. Besides application to data centers, another example is an open-plan building conditioned by unitary rooftop units.

Figure 2:
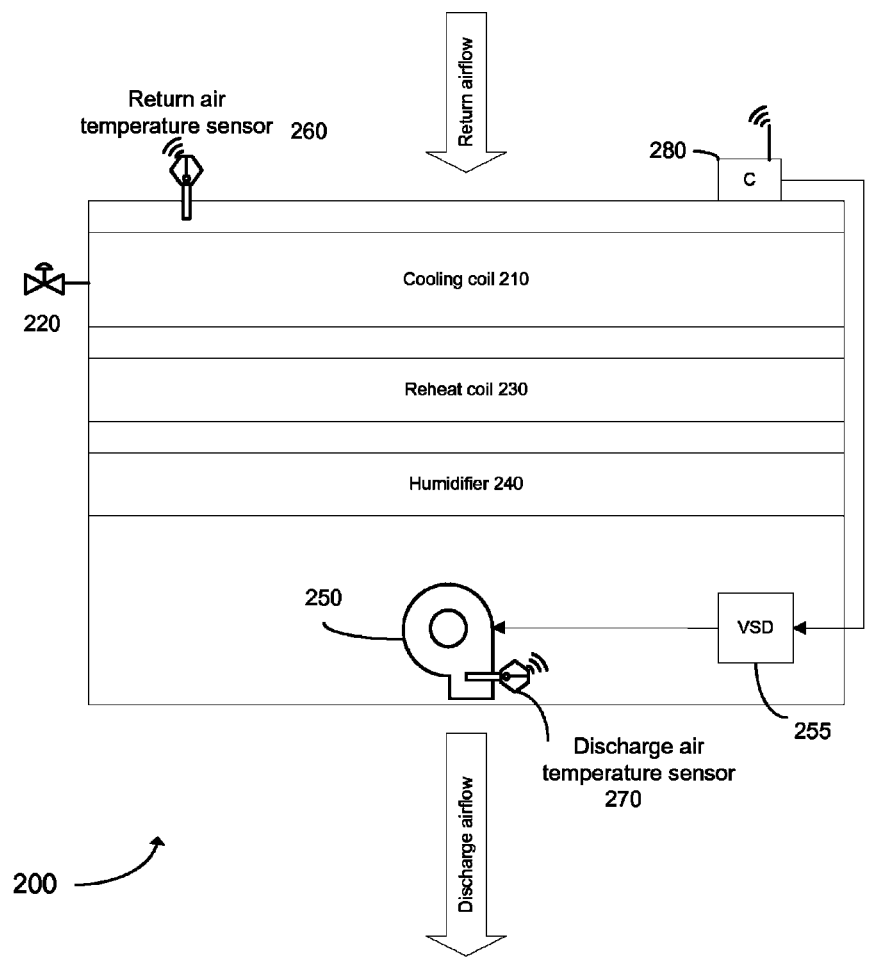
FIG. 2 is a schematic diagram of a computer room air handling unit 200 according to an embodiment of the present invention.

FIG. 2 is a schematic diagram of a computer room air handling unit 200 according to an embodiment of the present invention. Computer room air handling unit 200 is an example of an environmental maintenance module. As shown, computer room air handling unit 200 has a cooling coil 210, which may contain chilled water modulated by a chilled water valve 220. The computer room air handling unit 200 also has a reheat coil 230 (e.g. an electric coil) and a humidifier 240 (e.g. an infrared humidifier).

Fan 250 may be a centrifugal fan driven by an A/C induction motor. The induction motor may have a variable speed (frequency) drive VSD 255 for changing its speed. A wireless sensor 260 measures return air temperature, a wireless sensor 270 measures discharge air temperature, and a wireless control 280 to control the VSD 255. The discharge air temperature sensor 270 and return air temperature sensors 260 may be probes tethered to the wireless control 280 rather than separate wireless sensors.

Figure 3:
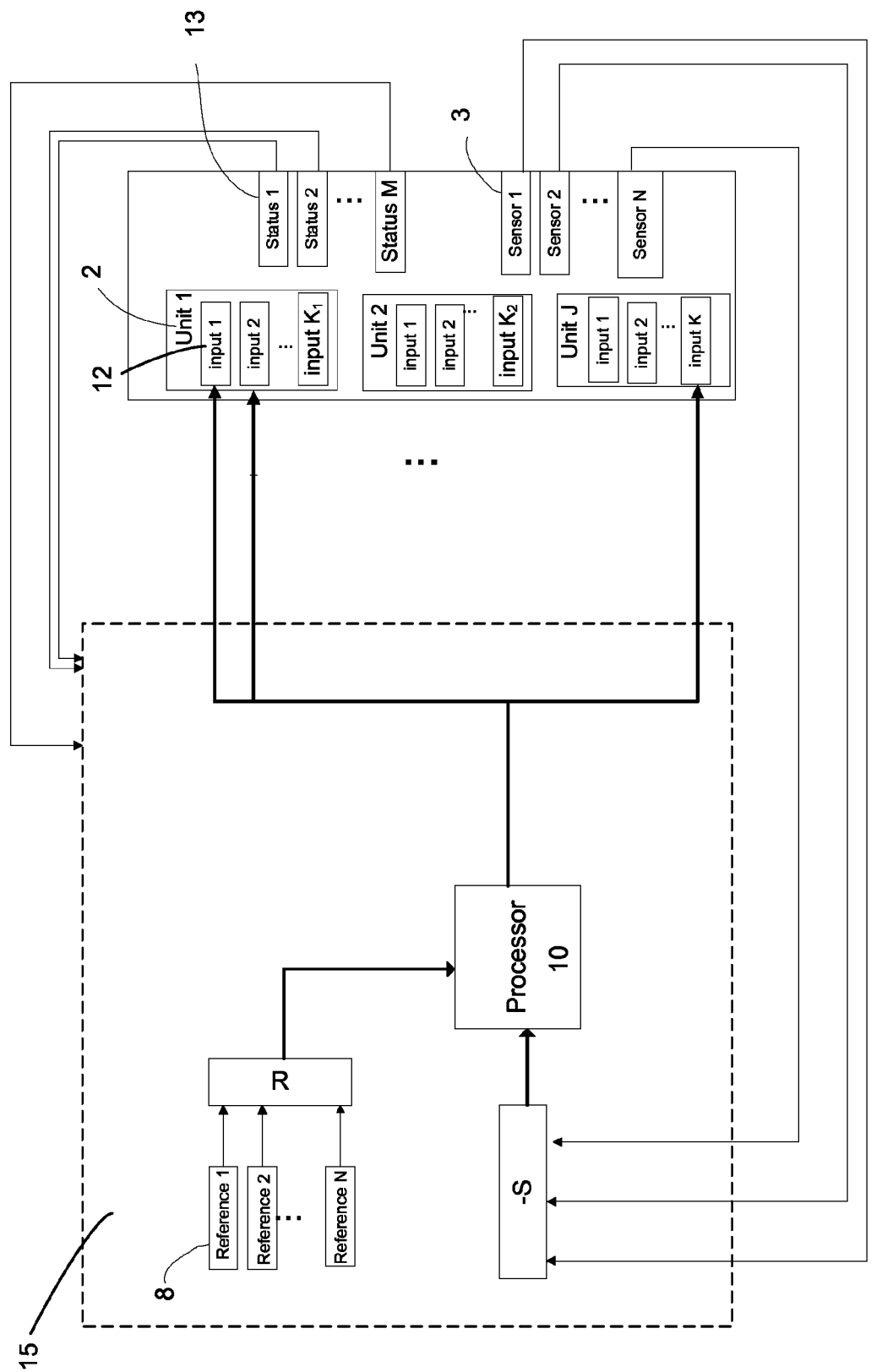
FIG. 3 is a block diagram of a control system 300 for providing maintenance of environmental conditions within a building according to an embodiment of the present invention.

In one embodiment of operation, the wireless sensors 260, 270 send readings over the radio to a wireless network gateway, which passes the signals to a control computer, e.g., which contains supervisory controller 15 of FIG. 3. Supervisory control 15 may be a computer system itself. The control computer can send actuation commands to the wireless gateway, which relays the commands to the wireless control 280, which changes the speed of the variable speed drive 255.

FIG. 3 is a block diagram of a control system 300 for providing maintenance of environmental conditions within a building according to an embodiment of the present invention. In this example, control system 300 comprises HVAC units 2 (such as unit 200), a plurality of environmental sensors 3, and a supervisory controller 15, which includes one or more processors 10 for performing calculations. The HVAC units 2 include final control elements (also called actuators), e.g., for fans, valves, or temperature elements, which may be used in maintaining the environment of a space. Inputs and outputs of the actuators may correspond to operation levels of a module, as mentioned herein. In one aspect, supervisory controller 15 can control the final control elements to have operation levels (including on and off, and variations in between) to provide stable environmental conditions using a reduced or minimal amount of energy.

A. Modules (HVAC Units)

In some embodiments, supervisory controller 15 can coordinate the operation of multiple HVAC units 2 by computing commands to inputs 12 of each HVAC unit 2. The commands are computed based on the environmental sensor readings from the sensors 3. The inputs 12 may correspond to a variety of different HVAC units 2 and/or devices or circuits within the HVAC units 2. For example, input 1 of HVAC unit 1 may correspond to the operational parameter of one actuator (e.g. a fan, temperature setpoint, humidity setpoint, or valve position), and the input 2 of HVAC unit 1 may correspond to a different actuator of the same HVAC unit 1. The operational parameter may have different operation values (levels), each resulting in a consumption of different amounts of energy. An HVAC unit 2 may have only one input for control of an operation level.

A setpoint for the temperature of an HVAC unit 2 can be provided from supervisory controller 15. For example, a setpoint may be the desired temperature of the air discharged by the HVAC unit 2, or the desired temperature of the air returning to the unit. Other inputs could be the setpoint for the humidity (or the humidifier command), or a command to a variable frequency drive (VFD).

In one embodiment, each HVAC unit has the same number of inputs, each corresponding to one actuator of that HVAC unit. In another embodiment, different HVAC units may have a different number of actuators. In such an embodiment, the number of sensors may be the same regardless of the total number of actuators. In part, a reason the number of sensors may stay the same is because each sensor may affect each actuator, and vice versa. For example, a temperature actuator (e.g. cooling valve) can affect the humidity as may happen when condensate forms on the cooling coil if the environment is cold enough. Likewise, humidity actuators (e.g. infrared humidifiers and evaporative cooling valves) affect the temperature, as may happen when infrared humidifiers raise humidity or evaporative coolers raise humidity.

B. Sensors

Environmental sensors 3 can measure a value of a physical condition of an environment, such as temperature, humidity, and pressure. Environmental sensors 3 can send their readings back to supervisory controller 15, e.g., by wired or wireless communication means (such as Modbus, BACnet, Wi-Fi, WiMAX, ZigBee, or any other applicable protocol). Examples of sensors include temperature sensors, humidity sensors, pressure, and pollution sensors (e.g., for measuring the density of particulate floating in air). A single sensor may be able to measure multiple environmental condition, e.g., all three of the above conditions. The environmental sensors 3 may be positioned randomly or according to a regular pattern. The environmental sensors 3 may also be organized via clusters of sensors or individually placed In some embodiments, supervisory controller 15 causes temperature sensor readings S to be within a temperature range R, e.g., as specified by an associated set of reference values 8. A difference between the sensor readings and specific reference values can be determined so as to determine whether the sensor readings are within a threshold range of the reference values (e.g., as depicted with −S). The range can simply be less than a certain temperature (e.g. less than 78 degrees Fahrenheit). The range can also be specified by two temperatures. Such a temperature range can be as small or as large as is desired. Such ranges can also be applied to heating. Certain embodiments can attempt to maintain a specified temperature range for each temperature (all of which may be different or be the same for each temperature sensor) while using a minimal amount of energy.

In one implementation, supervisory controller 15 internally stores the set of desired reference values 8 for each environmental sensor, e.g. in flash memory, cache, or other suitable memory. In another implementation, the reference values 8 may be stored externally, e.g. in a disk drive or optical drive. In operation, supervisory controller 15 adjusts operation levels of HVAC units 2 to keep the values from environmental sensors 3 with the specified range using a minimal amount of energy (e.g. by having the fewest possible modules running without exceeding the temperature range).

C. Inputs To HVACs

In one embodiment, supervisory controller 15 computes commands that are provided to inputs 12 and are used directly for final control elements (actuators) in HVAC units 2. These commands sent to the inputs 12 may be provided, e.g., by wired or wireless communication means. These commands may start, stop, or change any number of operation levels of the HVAC units 2.

In another embodiment, supervisory controller 15 computes commands to the inputs 12 that are used by a local digital controller (e.g. having microprocessor-based controls) in an HVAC unit 2. In one aspect, each input to the local digital controller of a unit corresponds to an actuator of the unit. The local digital controller can then determine the final commands sent to the final control elements. For example, the local digital controller may convert a digital signal to an analog signal for the actuator, or convert a protocol of the signal to be usable by an actuator. The local digital controller may also operate to maintain an actuator at a particular setting through a local control loop. Thus, supervisory controller 15 may command the setpoints of local control loops in the local digital controllers rather than directly commanding the final control elements.

D. Status Indicators

The supervisory controller 15 can receive status indicators 13 from the environmental sensors 3 and/or the HVAC units 2. In one aspect, the status indicators 13 can provide information as to whether an HVAC unit 2 or a sensor 3 is presently operational. In another aspect, the status indicators 13 can provide settings of the HVAC units, such as return air temperature, discharge temperature, portion (e.g. percent) of the capacity of the unit that is being used (which is an example of an operation level), and how much a chilled water valve (e.g. 320) is open. The status indicators 13 are shown separated from the HVAC units 2 and sensors 3 for illustrative purposes, and may actually be received from the HVAC unit 2 or sensor 3 themselves.

In one embodiment, the status indicators 13 for the HVAC units 2 may be obtained from local digital controllers of the HVAC units 2. These local digital controllers can be queried by supervisory controller 15 to determine if the local digital controllers or the HVAC units 2 are "on" or "off". If a unit is "off", then the status indicator 13 for that unit's actuators could be a certain value, e.g., zero.

In another example, the environmental sensors 3 have some well-defined and easily detected failure modes. In one aspect, one failure mode is "unreachable", which means that a gateway, e.g. a network interface of the supervisory controller 15, cannot communicate with the sensor. Another failure mode may be an out-of-range voltage (either 0 volts or 1.5 volts), where 0 volts implies that the sensor probe has a short circuit and 1.5 volts indicates that the sensor probe has an open circuit or is missing. Any of these failures may result in a status indicator of zero for that sensor.

II. Transfer Model

The transfer function model (TM), e.g., having the form of a matrix, is a measure of the effect of increasing (and potentially equivalently decreasing) an actuator on an environmental sensor. The matrix can provide the effect for every sensor in the system, or just a portion of the sensors. In one aspect, the number of rows J of a matrix TM can equal the number of environmental sensors (also called cold aisle sensors or inlet air sensors for embodiments using having CRACs cooling server racks), and the number of columns can equal the number of environmental maintenance modules. Thus, in one embodiment, there is only one column for each module. In such an embodiment, there would be only one measure of the energy consumption of a module, i.e., one parameter for which an operation level is determined. In another embodiment, there may be more than one row for a module (e.g., when a module has multiple actuators, each having a different input), and thus there can be more than one parameter, each providing a measurement of an operation level of the module. Note that the rows and columns may be switched. Also, the term "matrix" may be any indexable array of values.

In one embodiment, the transfer model can be obtained by changing one or more operation levels at a time and measuring a change in the sensor values. In one embodiment with one operational parameter being changed at a time, the matrix elements of one column of a matrix TM that corresponds to the changed operational parameter are determined after the new sensor values are received. If the operational parameter is $U_{indx}$ (which has a one-one correspondence with an actuator in this embodiment) and the sensor index is $S_{indx}$, then a matrix element $TM(S_{indx}, U_{indx})$ can be computed as:

$$TM(S_{indx}, U_{indx}) = \frac{(Y2 - Y1)}{(\Delta level)},$$

where Y2 is the sensor value corresponding to $S_{indx}$ after the operational parameter $U_{indx}$ is changed, Y1 is the sensor value corresponding to $S_{indx}$ before the operational parameter $U_{indx}$ is changed, and $\Delta level$ is a change in operation level of parameter $U_{indx}$. A normalization factor may also be used, e.g., if the change was not the same for each actuator.

When the sensor values are a temperature and the modules function to cool, values of matrix TM will typically be negative, e.g., because shutting off a module (or other decrease) should make Y2 greater than Y1, and the change in operation level ($\Delta level$) is negative. A similar result happens with starting a module (or other increase) as the temperature difference is negative, but $\Delta level$ is positive. However, in practice some transfer matrix elements can have opposite sign of others, which may be counterintuitive.

Matrix TM can be normalized such that all of the matrix elements can correspond to the same units of $\Delta level$. For example, regardless of the actual change in level used to calculate a particular matrix element (e.g., 10%, 10 rpm), the matrix element can be multiplied by a factor so that every matrix element will have the same value in the denominator. Thus, in later steps a change in operation level can be used uniformly to determine a change in predicted temperature as opposed to the change in operation level being in different units for each matrix element.

In one embodiment, the $\Delta level$ is a percentage of the change in the operation level, e.g., 100% for turning on to maximum capacity of the operation level, and −100% for turning off from the maximum operation level. In another embodiment, $\Delta level$ is in units relative to minimum increments used to create the transfer matrix TM. For example, if the increment is 5V, 100 rpm, or other value (including percentage), then a change of 10V would be a value of 2 and 300 rpm would be a value of 3 if the transfer matrix TM was in units of the minimum increment. In yet another embodiment, if the transfer matrix was created in units based on a maximum level of operation across all modules (e.g. maximum power or fan setting), then $\Delta level$ can be a fractional value. Each module can have a different range of operation level, e.g., one fan can have maximum speed of 2000 rpm and another 1000 rpm. In one aspect, $\Delta level$ could provide normalization by itself. For instance, if the changes are always the same for a particular parameter then a normalization factor may not be needed.

The transfer model can be updated during operation by tracking the change in the sensor values when the operation levels change. For example, the values of TM for the increased actuator (e.g. a started module) may be updated using the equation above. In this manner, one can determine how accurate the initialization was or adapt to changes in the load whose temperature is being maintained, and TM can be refined in response. Accordingly, this updating can handle a changing relationship in the transfer model. In this way, the system would change along with changing variables of the system, and thus may continue to provide accurate estimations.

In some embodiments, the first step of the update can be to record sensor values before any operation level is increased, as well as the operation level (e.g. percent capacity) of the selected actuators (which can include identifying the actuator to be off). A next step of the update can be to record the sensor values after a set time period or after the criteria is met, as well as the operation level of the actuators that have been increased. In one embodiment, the new matrix elements of TM in Equation 1 are calculated for the column(s) j corresponding to the actuators that are changed. The new TM is then updated as follows: $TM(i,j)_{new} = g \cdot TM(i,j)_{new} + (1-g) \cdot TM(i,j)_{old}$, where g is between 0 and 1 (e.g. a default 0.3). The value of g may vary with time or depend on another variable. In one implementation, other older TM matrices (i.e. matrix elements from previous updates, such $TM_{older}$) may be used to mix to obtain the $TM_{new}$.

In one embodiment, the operation levels of each of the actuators are measured and each of the columns are updated. Thus each of the rows would have the same change in sensor values, but the change in operation levels would vary. These other matrix elements can be computed when the operation level is an output level, which may change even though the input to only one actuator is changed.

The following is an example how the transfer model (e.g. as a matrix) can be used to predict a resulting sensor value for a given change in the operation level U of the actuators. In one implementation, the predicted change value in the sensor values is obtained using the transfer matrix TM using the equation: $Y_{post}=Y_{pre}+TM(S_{indx},U_{indx})*\Delta\text{level}(U_{indx})$, where $Y_{post}$ is the estimated sensor value after a change, $Y_{pre}$ is the current sensor value that is out of range, $S_{indx}$ corresponds to the sensor that is out of range, and $U_{indx}$ corresponds to an actuator being considered for increasing an operational level. The predetermined increase is Δlevel, which may be different than the value used to create the transfer matrix TM. And, as mentioned above, Δlevel may be different than an actual amount that the actuator is increased.

One can then identify whether $Y_{post}$ is out of range for each of the sensors. In some embodiments, the desired range can be defined by a target value for a room. Examples of ranges include plus or minus a certain value from the target value, any value below the target value, or any value above the target value. The desired range may be web-configurable, with a default value (e.g. 83 degrees Fahrenheit for temperature of a data center). In another embodiment, a sensor may be identified as being too cold, e.g., when the environment is required to be above a particular temperature. In such an embodiment, the modules would be providing heating and not cooling.

III. Cost (Penalty) Function

As mentioned above, the operational parameter for a particular actuator may have different operation values (levels, settings, etc.), each resulting in a consumption of different amounts of energy. This varying use of energy (e.g. electricity, steam, natural gas, etc.) can increase the costs of operating the system. Furthermore, the energy use for each of the actuators can vary among the different types of actuators, and even within a particular type of actuator. The cost of running an actuator can also be dependent on maintenance costs, which can also vary depending on settings of an actuator. Thus, to account for cost (e.g., energy and/or maintenance) of running an actuator can be quite complicated, particularly when a desired sensor range is also desired.

In some embodiments, a penalty function is used to determine an optimal change dU to the actuator state U (operation levels). The penalty function can include one or more of the various contributions, such as a sensor contribution that increases the penalty when sensor readings are out of range, a cost contribution that increases based on energy usage and/or maintenance costs for running at a particular setting, and a stability contribution that discourages large changes in the actuators. The optimal change dU, as calculated from an optimization of the penalty function, can be used directly to change the actuators or be used in an additional function to provide the final change to the operational levels U. Such a method of determining a change in the operational parameters can be combined with any other methods mentioned herein.

Accordingly, the penalty function P (also called a cost function C) can include penalties for out of range sensor readings. The penalty for an out of range sensor reading can increase as the sensor becomes more out of range. The penalty function may be constructed to not penalize readings from sensors that have a status indicator that they are faulty or unreliable. The penalty function may also be constructed so that a configurable number of sensor readings that are most out of range are not included in the penalty function. This non-inclusion of the most out-of-range sensors can serve the purpose of not penalizing readings from sensors that may either be faulty but not diagnosed as faulty, or that may be improperly located.

The penalty function P can also include an estimate of the power consumption of each actuation command. For example, the power consumption of fans has a theoretical relationship to the cube of fan speed. The relationship between fan speed, flow, pressure, and power is commonly called a fan affinity law. If fan speed is an actuation command, and if the power consumption of a fan at full speed is known, then the fan affinity law can be used to estimate fan power after the fan speed has been changed. For example, if an operational level $U_i$ is the setting for the fan speed, then a cost can be proportional to $(U_i)^3$. Each actuator can have a different function for its cost contribution. Thus, the operational level $U_i$ can be an input into a function $C_i$ to obtain the cost $c_i=C_i(U_i)$.

The penalty function also can have penalties for control actions that have non-energy costs. For example, starting or stopping a CRAC unit may have a maintenance cost associated with it. For instance, starting may cost a penalty. Also, running fans or other actuators may decrease the life of certain parts, and such a decrease in the life of the part can depend on the operational parameter for the actuator. Thus, the cost can be an overall cost of operation.

In one embodiment, the optimized values for the operation levels are constrained. For example, the optimized operation levels may not be allowed to be zero, e.g., where everything is off. Such a constraint may be a hard constraint (e.g. such values are not allowed). In another implementation, the constraints are included in the penalty function and cause a higher value, thereby not providing a minimum at certain points (e.g. no minimum at zero). Such constraints can be considered soft constraints. These other penalty function terms (some or all may be called penalty function terms) may be created from the transfer model TM that is used to predict sensor values. When the sensor values are far from a reference value then the term becomes larger. The increase in this term can be non-linear, e.g. exponential. The exponential increase may not occur until the difference is large enough (e.g. greater 10 degrees), but be linear when the sensor value is closer (e.g. within 10 degrees).

As mentioned above, the penalty function can be a function of the operational parameters U of the system. In various examples, the operational parameters may be an input to each respective actuator of the system, an input that is provided collectively to a portion of the actuators, or an input to all of the actuators. For example, each fan of the different modules can be run by the same operational parameter, which would be an input that corresponds to one portion (set) of the actuators. Another operational parameter can control each chilled water valve of each module. Alternatively, a fan or valve for each module can be controlled independently.

In one embodiment, the optimal change dU can be determined from a minimization of the penalty function P. In order to estimate what the value p of the penalty function will be, the transfer model TM can be used to estimate the resulting sensor values S. This estimate can be used to determine the penalty value p for a particular change dU. Thus, an optimal dU (at least according to some stopping criteria) can be determined from a current measurement of the sensor value.

Figure 4:
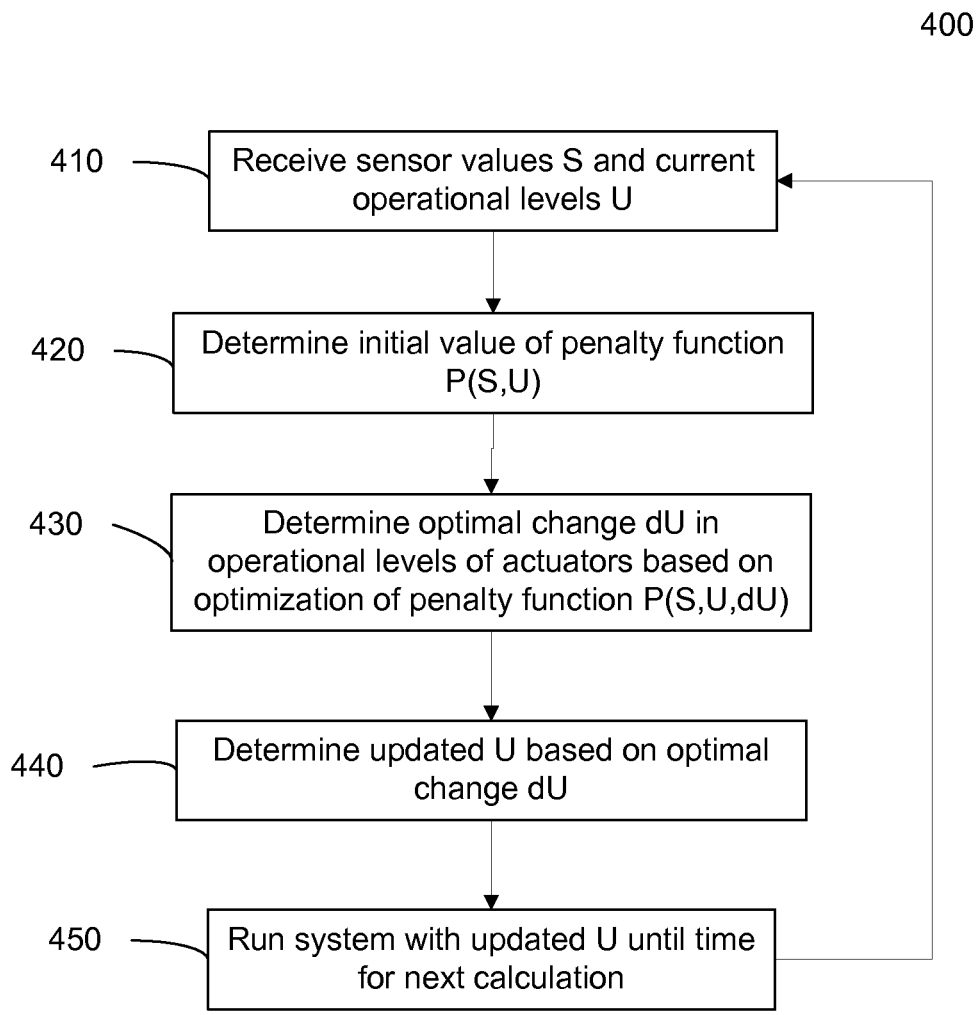
FIG. 4 is a flowchart of a method 400 for controlling an environmental maintenance system using a penalty function according to embodiments of the present invention.

FIG. 4 is a flowchart of a method 400 for controlling an environmental maintenance system using a penalty function. Method 400 can be implemented with supervisory controller 15 of FIG. 3.

In step 410, current sensor values S and current operational levels U can be received. The sensor values can be received from sensors placed at various locations, and the sensors may measure various physical conditions.

In step 420, an initial value of the penalty function P is determined. The initial value can be determined from the current operational levels U, as well as other variables.

In step 430, an optimal change dU in the operational levels is determined by optimizing (e g minimizing) the penalty function P, which can be a function of the sensor values S, the current operational state U of the actuators, and a potential change dU. Additional details for examples of optimizing P are provided below. In one aspect, the optimal change dU is optimal simply because it reduces the value of the penalty function P. Different dU of a group may be tried in an optimization method to determine the dU of the group that has the lowest value for the penalty function P.

Regarding the optimization, assuming that U is a vector that represents the operation levels (values) of the parameters, the penalty function P can output a single value p. Thus, in one embodiment, the penalty function can be represented as P(U) for a given set of operation levels. As described herein, a transfer model (e.g. a transfer matrix) can be used to relate U to the sensors S, (where both are used in the determination of P), thus U can define the system. The function P(U) can be minimized to find the U that corresponds to the minimum value for p. The values of U can also subject to constraints, as described herein.

Equivalently, a penalty function P could be created where the maximum (instead of the extrema of a minimum) could be used. The extremum could be a local extremum. Any suitable optimization methods may be used. For example, gradient methods or simpler error difference methods can be used to find the extrema. In one embodiment, a global optimization method such as stochastic methods (e.g. simulated annealing and Monte Carlo), deterministic methods, heuristic methods, or other suitable methods can be used.

In step 440, an updated operational state $U_{upd}$ is determined from the optimal $dU_{opt}$. For example, an updated operational state $U_{upd}$ could be taken as $U+dU_{opt}$. As another example, $U_{upd}=\lambda U+(1-\lambda)(U+dU_{opt})$, where $\lambda$ is a mixing coefficient.

In step 450, the actuators are operated with the updated U until the next time U is to be updated. The time for updating can be periodic or variable based on triggers or based on measured values, such as the sensor values.

P can include various contributions. For example, P can equal $P_E+P_S+P_M+$ other terms, where $P_E$ is the energy contribution, $P_S$ is the penalty for difference in sensor values, and $P_M$ is the penalty for extra maintenance costs for making changes (e.g. starts and stops). In one embodiment, maintenance cost has different costs associated with at least two ranges of operation levels. Any contribution of a particular type can be composed of an aggregation (e.g. a sum, weighted sum, or other function) from portions for respective sensor values or respective U values.

$P_S$ can be determined by comparing the sensor values S with the reference values R, as is mentioned above. Each sensor value can be compared to one or more reference values. For example, $S_i$ for a particular sensor can be compared to $R_i$ (e.g. to see if the sensor value is out of range) and the difference can be aggregated (e.g. a sum) along with partial contributions from other sensors. The difference can be multiplied by a proportional factor (e.g. a gain) before aggregation to obtain the partial contribution. For instance, a difference of a temperature from a setpoint can be multiplied to obtain the contribution of the penalty for that particular sensor. The contribution $P_S$ can be used in embodiments that require a hard constraint that at most a specific number of sensor values are out of range. Thus, the sensor values may be used into two ways. Other embodiments may omit $P_S$.

In a more general sense, the partial contribution $P_S(S_i)$ to $P_S$ for a particular sensor can be a function, where the function can be based on $R_i$. For example, the function $P_S(S_i)$ can be for any value less than a setpoint, and then increase in any desired fashion for values of $S_i$ greater than $R_i$. As an alternative for comparing against multiple reference values, the function can be positive for values less than a particular range (e.g. a desired temperature range), zero within the range, and positive for values greater than the range, with the positive values on either side of the range potentially having different functional forms. Each of the contributions $P_S(S_i)$ may then be used to determine the overall value for $P_S$, e.g., by summing.

Accordingly, a measured value of S can be used to determine $P_S$. In one embodiment, to determine $P_S$ for each of various values of dU during an optimization method, the transfer matrix TM may be used. For example, $S_{new}=S+TM*dU$, and then $S_{new}$ may be used to determine the new $P_S$ corresponding to the dU.

In a similar manner, $P_E$ can be determined from the settings $U_i$ of each actuator. The $U_i$ can be input into a function that correlates the operational level to an energy cost (e.g., cost of electricity). As mentioned above, the function could include a term of the form of the cube of $U_i$, e.g., $P_{Ei}=aU_i^3+$other terms. The total value $P_E$ can be obtained from an aggregation of the portions $P_{Ei}$. In one implementation, $P_E$ can account for a current price of electricity (or whatever energy is being used, such as fuel). For example, $P_{Ei}=(0.05+0.95*(U_i^3))*$price per kilowatt. In one aspect, the 0.05 can be considered a minimal energy use to have the actuator plugged in. Note that the relationship between the operational level and the energy cost could be of any functional form (e.g. exponential, quadratic, etc.).

In one embodiment, to determine $P_E$ for each of various values of dU during an optimization method, a computer system can compute a new U. For example, $U_{new}=U+dU$. The $U_{new}$ can then be used to determine the value of $P_E$ that corresponds to a particular change dU. $P_M$ can be determined in a similar manner as $P_E$. As both $P_E$ and $P_M$ are dependent on the state of U, a contribution $P_U$ dependent on the state U can equal $P_E+P_M$.

Other contributions to the penalty function can include a penalty $P_{dU}$ for the amount of change dU. The penalty can penalize large changes in U. In this manner, the method can be made more stable. In one embodiment, the value of $dU_i$ is compared to a limit $du\_Limit_i$. Another contribution can be a penalty for $U_i$ exceeding a lower or upper limit. An example for a limit on U is when controlling temperature set point (an example of an operational level), this temperature set point should not go below a given lower limit, or else condensation can form, which can cause additional energy for cooling (and cleaning up the condensation). Thus, the function could be positive below a lower limit, zero between the limits, and positive above the limit. The positive contributions could simply be the different multiplied by a gain term, or have more complicated functional forms.

Any of the contributions to P may be made up of individual terms for each actuator or sensor, as the case may be. For example, $P_{E,J}$ can provide a mapping of an operation level J to an energy consumption. The mapping may be non-linear. The mapping can be a matrix, which may provide linear coefficients of non-linear functions. In one implementation, a mapping matrix in $P_E$ (or other functional part for $P_E$) can be updated by sampling some data points and determining the coefficients that fit the functions to the parameter-energy consumption relationship for each parameter.

The $P_E$ term can help to decrease the energy consumption. But as this is happening over time, a boundary can occur where the energy consumption cannot be driven down any further. One boundary can be the S cost for exceeding set points. While in this boundary region, there can be an optimal setting for U. Other contributions can refer to boundary limits of the actuators or how much they are allowed to change at any given time.

Figure 5:
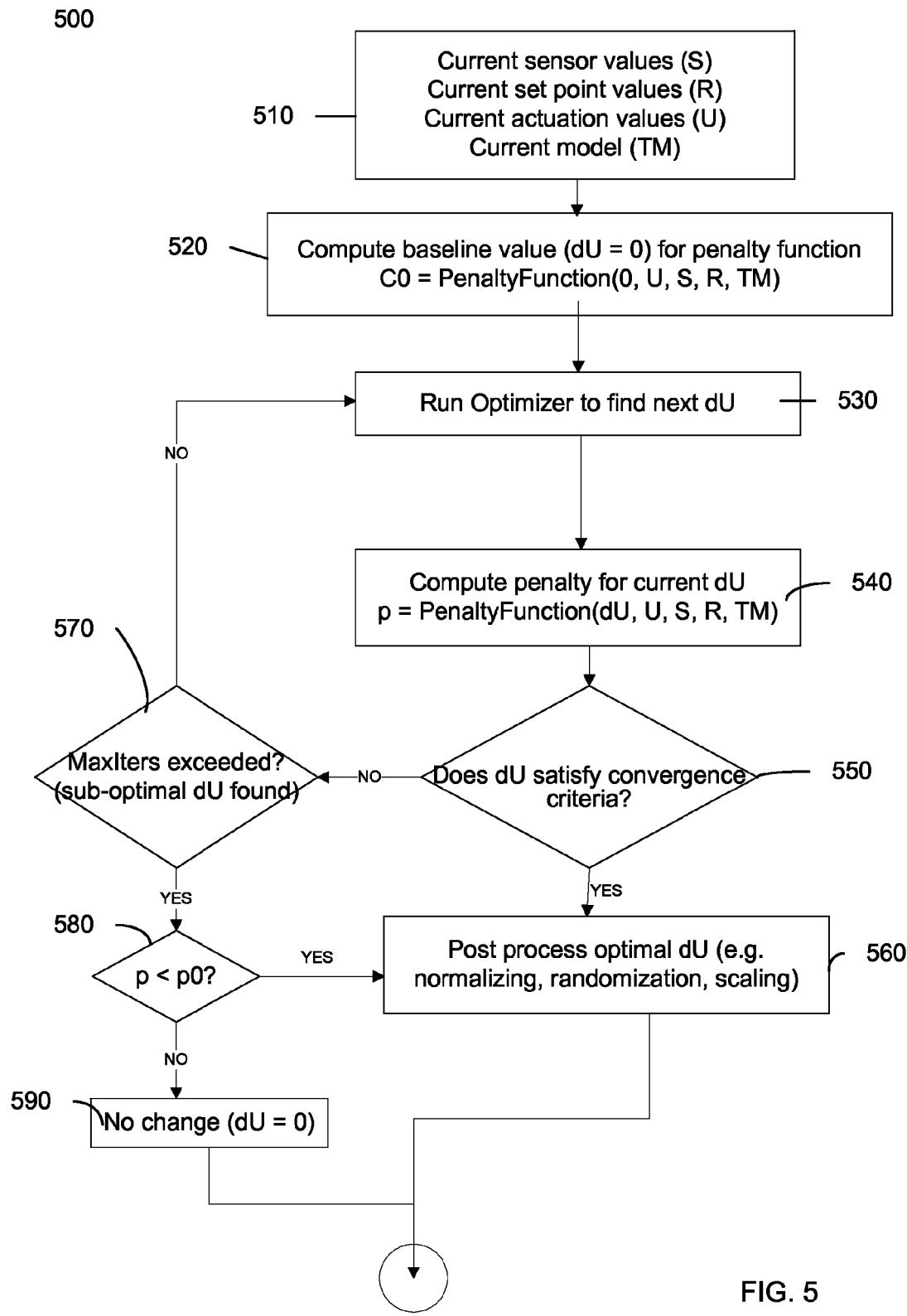
FIG. 5 shows a flowchart illustrating a method 500 for controlling an environmental maintenance system according to embodiments of the present invention.

FIG. 5 shows a flowchart illustrating a method 500 for controlling an environmental maintenance system according to embodiments of the present invention. In step 510, data about the system is received. For example, current sensor values S (such as current set of environmental measurements—e.g., server inlet temperatures), current set point values R (such as current set of reference values per measurement—e.g., cold aisle set points), current actuation values U (such as current actuation state per actuator—e.g., fan speed), and current model (e.g. transfer matrix TM) can be received. Other data can also be received, such as: the acceptable limit of actuation change per actuator (which may differ per actuator); upper/lower limits of actuation per actuator (which can be the same for each actuator)—e.g., 0%/100% fan speed; cost multipliers to be used in determining a particular penalty contribution—e.g., for fan speed constraints, inlet temperature constraints; and a set of each actuator parameters needed to compute lowest energy cost at a given actuation value (e.g. the 0.05 value above for $P_E$).

In step 520, an initial value C0 for the penalty function. This initial value can be considered a baseline value in that dU is taken to be 0 for this initial value. The initial penalty value can be written as C0=PenaltyFunction(0, U, S, R, TM). As mentioned above, one contribution to the penalty can be for exceeding reference values for respective sensors. Other contributions can be for actuation values exceeding lower/upper actuation limits for respective actuators and for actuation value cost of energy for all actuators.

In step 530, an optimizer routine is run to find next dU. This next dU is a possible change to the actuators in an attempt to find an optimal dU as determined from the penalty function. Ideally, the optimal dU minimizes the penalty function based on the current U, S, and R, using the model TM. The dU can define the actuation change for each actuator from the current state U. In one embodiment, the value of dU can be understood as a vector for searching the variable space to find the U that minimizes the penalty function. For example, a gradient method (e.g., conjugate gradient) can be used to determine a best direction for dU. In one implementation, to determine the appropriate length, an approximation (e.g. quadratic approximation) can then be used for a scalar on the direction of dU. In another example, dU is determined using a simplex method, such as the Nelder-Mead method. Other embodiments can use method 700, as described below.

In one embodiment, the value of dU can be constrained to not be too large. For example, there can be a penalty for exceeding an input change limit for all actuators. Such a constraint can provide stability to the system by keeping the changes relatively small. In one embodiment, if any change per actuator exceeds an actuation change limit, then the difference is multiplied by a cost multiplier. A sum of all these excess actuation change limit penalties can be computed to determine this penalty function contribution.

In step 540, the penalty for the current dU is computed. For example, the general functional notation p=PenaltyFunction(du, U, S, R, TM) can be used. As mentioned above, one contribution to the penalty can be for the sensor values exceeding reference values R. As described above, the transfer model (e.g., a transfer matrix when the model is linear) can be obtained that predicts a temperature value (or change) based on a change in an operation value U. To determine the $S_{new}$, matrix TM can multiply the actuation change dU to find the projected change in environmental measurements ($S_{new}$). In one embodiment, the penalty function for a sensor difference from reference values can be written as $P_S(TM(U))$, where TM(U) can output the sensor values as a vector S. The vector S can then be compared to reference values R. Thus, $P_S$ can be a function of R-TM(U+dU). For example, if any measurement exceeds its reference value, a computer can multiply the difference by a cost multiplier. A sum for all the measurements that apply can be computed this penalty contribution.

For the penalty for energy use $P_E$, at the current projected actuation value for an actuator, the energy consumed is determined based on functions that may be specific to a certain type (or even model) of actuator. The state U of these actuators can be used to compute the total energy cost (e.g., using a kW rating for each actuator, such an affinity law for fan speed). An actuator-specific function may have more than one parameter to compute the energy cost, e.g., the operational level, the cost of electricity, an energy efficiency parameter, etc. To determine the new actuator state $U_{new}$, the method can add the actuation change to the current actuator state to get the projected actuation value. As with the other contribution, the energy costs could be summed over the actuators. In one example, if any new operational level exceeds a respective lower limit, the method can multiply the difference by a cost multiplier. An upper limit can also be used, as is described above. Other contributions not mentioned can be implemented in a similar manner.

The penalty functions can have hard and/or soft constraints on the optimal dU. A hard constraint is when the dU is not allowed to have certain values. A soft constraint is when dU is allowed to have certain values but the values cause ever increasing penalty values so that such dU values would only be explored with high penalty.

In step 550, it is determined whether the optimization method is converged. For example, it may be determined that the penalty value p has not changed significantly from one iteration to the next. As another example, it can be seen that two consecutive dU are similar enough (i.e., the adaptive step size is computed to be small). One skilled in the art will appreciate the various convergence criteria that can be used. If the one or more convergence criteria are met, then the current dU is taken as an optimal dU. The term criteria can mean the singular criterion as used herein.

In step 560, if the one or more convergence criteria are met, the optimal dU may be further modified. For example, the optimal dU can be normalized, randomized (e.g., by a small amount), and/or scaled. In one implementation, dU=rho*dU, where rho is a scaling factor. So in effect, $U_{new}$=U+rho*dU. For normalization, a normalized optimizer can compute dU relative to a maximum allowed actuation change limit. For randomization, the randomization can occur under a possibly random schedule. For example, a dU that does not minimize the penalty function, but does reduce it relative to the baseline, can be used. In one implementation, such a suboptimal decision can be taken at each predictive decision cycle with a specified probability. In another implementation, a suboptimal decision can be taken at each R predictive decision cycles. For scaling, a default can be to scale down by a configurable constant. In one aspect, rho may be determined based on an accuracy of the transfer model, e.g., using a regression table and Pearson correlation coefficient, which can be used as rho.

In step 570, if the convergence criteria is not met, an optional step is to check whether the maximum number of iterations (MaxIters) has been reached. If the maximum has not been reached, then method 500 returns to step 530 to select a new dU. If the maximum has been reached, the current dU may then be used, depending on certain criteria. In one embodiment, to apply randomization, the number of optimization iterations can be randomized such that it is less than the number that would be taken if a suboptimal decision were not being made.

In step 580, it can be determined whether the current penalty value p is less than the baseline p0. If p<p0, then the current dU is at least better than no change at all. The process then may proceed to step 560 to perform any post-processing. If p is not less than p0, then no change in U may be made at step 590.

Figure 6:
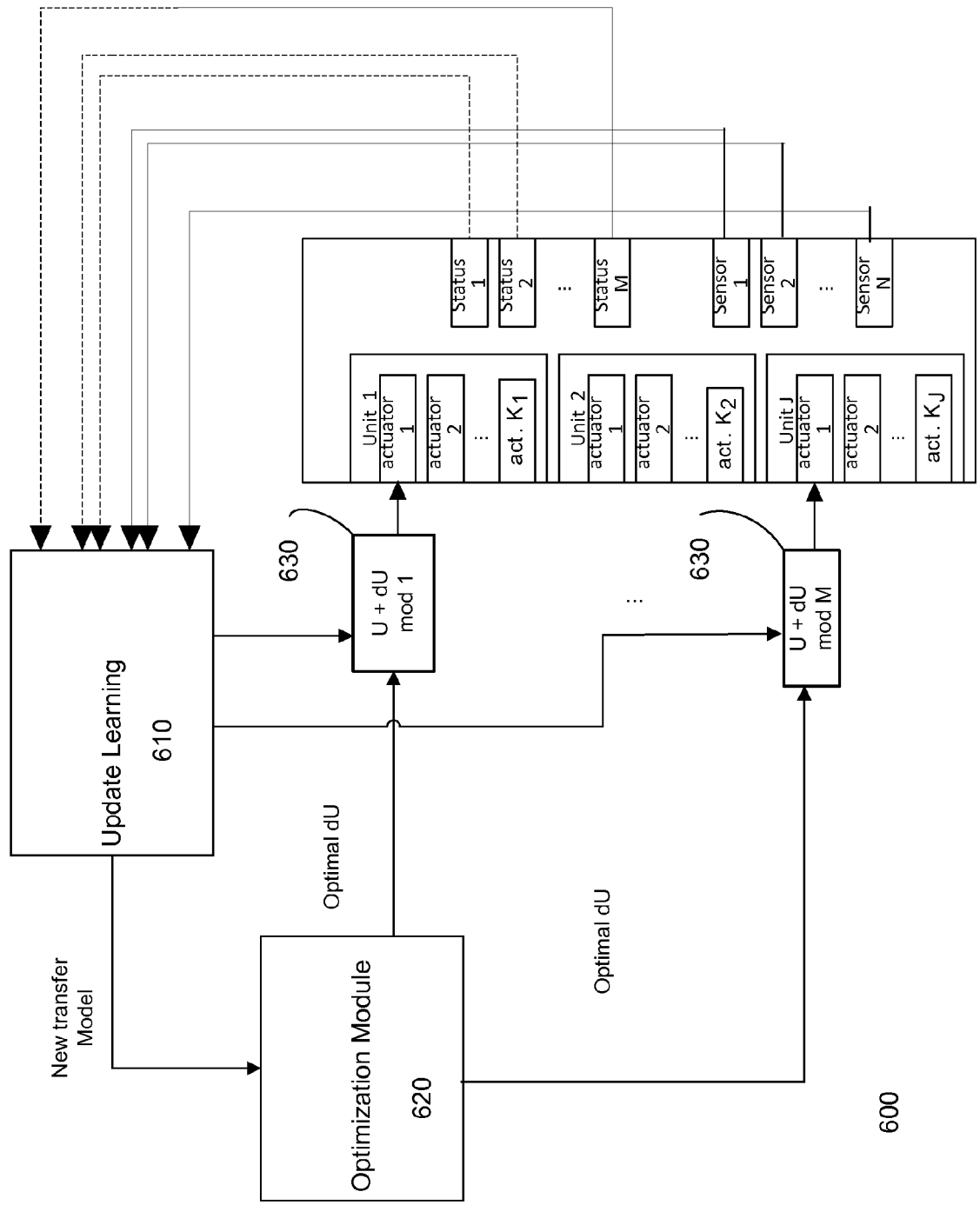
FIG. 6 shows a block diagram of a system 600 for determining an optimal dU to be used in controlling an environmental maintenance system according to embodiments of the present invention.

FIG. 6 shows a block diagram of a system 600 for determining an optimal dU to be used in controlling an environmental maintenance system according to embodiments of the present invention. System 600 is similar to system 300 regarding the HVAC units, actuators, status indicators, and sensors. An update learning module 610 can receive the status and sensor updates, and use them to update the transfer model TM, e.g., as described above. The updated transfer model can then be used by optimization module 620 to determine an optimal dU.

The optimization module can receive the input (e.g., U and S) as mentioned above via the update learning module or through other connections not shown. The optimization module 620 can use any of the penalty functions mentioned herein to determine an optimal dU. Modulators 630 may be used to perform post-processing on the optimal dU, as is mentioned above. The output of these modules provides the new settings U for the actuators. Any of these modules may be its own circuit, combined with other modules on one circuit, or be a different software function implemented on a general purpose processor.

In one implementation, a current cost of electricity (or other energy source) is obtained via a network connection to an electricity provider or network. The optimization module 620 can then use the cost of electricity in a function for determining a cost based on an operation level.

The update learning module 610 can also determine an accuracy of the transfer model, which can be used in a post-processing step as implemented via modulators 630. The following description provides more details and broader concepts about determining an accuracy of a transfer model and using the accuracy to determine a new U.

In one embodiment, there can be two iterative loops. The higher frequency loop is the feedback loop that determines operation levels based on measured differences in the sensor values and a slower frequency loop that determines the optimized values. For example, the predicted operation levels as determined by the optimization module 620 could be input at a first frequency (e.g. every 15 minutes) and in between such inputs, the feedback from the sensors can be input into a simpler model (e.g. into a model that uses the inverse of the TM and/or different proportional-integral-derivative (PID) objects) to determine the inputs to the actuators at a second frequency (e.g. every 15 or 30 seconds).

An accuracy metric of the transfer model can be used to modify the optimal dU. The proposed change to the operation levels of the actuators can be adjusted, for example, based on the level of correlation between model predictions of sensor data and actual sensor readings. For example, an optimal dU can be scaled by the Pearson coefficient indicating how close the predicted sensor values have been to the actual sensor values. In this manner, if the transfer model is accurate, then the optimal dU be used directly (Unew=U+dU), or at least most of it (Unew=U+rho*dU, e.g. with a scaling coefficient rho of 0.8 to 1.0). However, if the transfer model is proving to be inaccurate, the scaling coefficient rho can be small (e.g., less than 0.1) or even zero.

In one embodiment, the adjustment can be achieved by changing a parameter in the penalty function. For example, lower and upper limits for operation levels of an actuator may be modified. Such changes can affect a particular penalty contribution, which can cause a proposed dU to be modified in order to reduce the penalty caused by dU exceeding this limit. For instance, assume that the transfer model is shown to be accurate, then the upper limit can be reduced so that energy is saved, while keeping the sensors in line with set points since the model is accurate. If the model is not accurate, then the penalty function may not want to restrict the operational levels U, since such a constraint may cause the sensor values to exceed their set points due to errors in the model.

The operational levels of the actuators can be set based on the adjustment to the proposed change. In this step, Unew is calculated, e.g., as provided above via formula Unew=U+rho*dU, where rho*dU is the adjusted change. In another example, rho*dU may be scaled, offset, or otherwise modified again before adding to U. Such a scaling may occur based on extremum or midpoint settings for a particular actuator or group of actuators, which is described in more detail below. In yet another example, rho*dU and U can be input into a function that determines Unew.

IV. Optimization Method

In certain embodiments, the optimization problem is characterized by a multitude of controls (e.g. one for each actuator) whose values (operation levels) can be selected in order to adjust the desired cooling. The control values U span a mathematical, multidimensional control optimization space. A point in this space defines a particular set of control values for the AHUs. Embodiments are applicable to any number of controls but can be particularly advantageous over other optimization methods for preferably more than ~10 controls and even more preferably several dozen to hundred and more controls. The control values can be discrete (specifically digital or on/off controls) or continuous (analog). In addition control constraints may be imposed on the control values. For example, the operation levels (control values) can have minimum (e.g. off or 0) and maximum (e.g. 100%, which could correspond to a particular voltage) limits.

To illustrate the magnitude of the optimization problem, consider a data center with 100 AHUs that can be turned on and off. There are $2^{100}$ possible combinations of control values in this case. These are far more combinations than could possibly be wholly investigated with practical means.

A. Method

Figure 7:
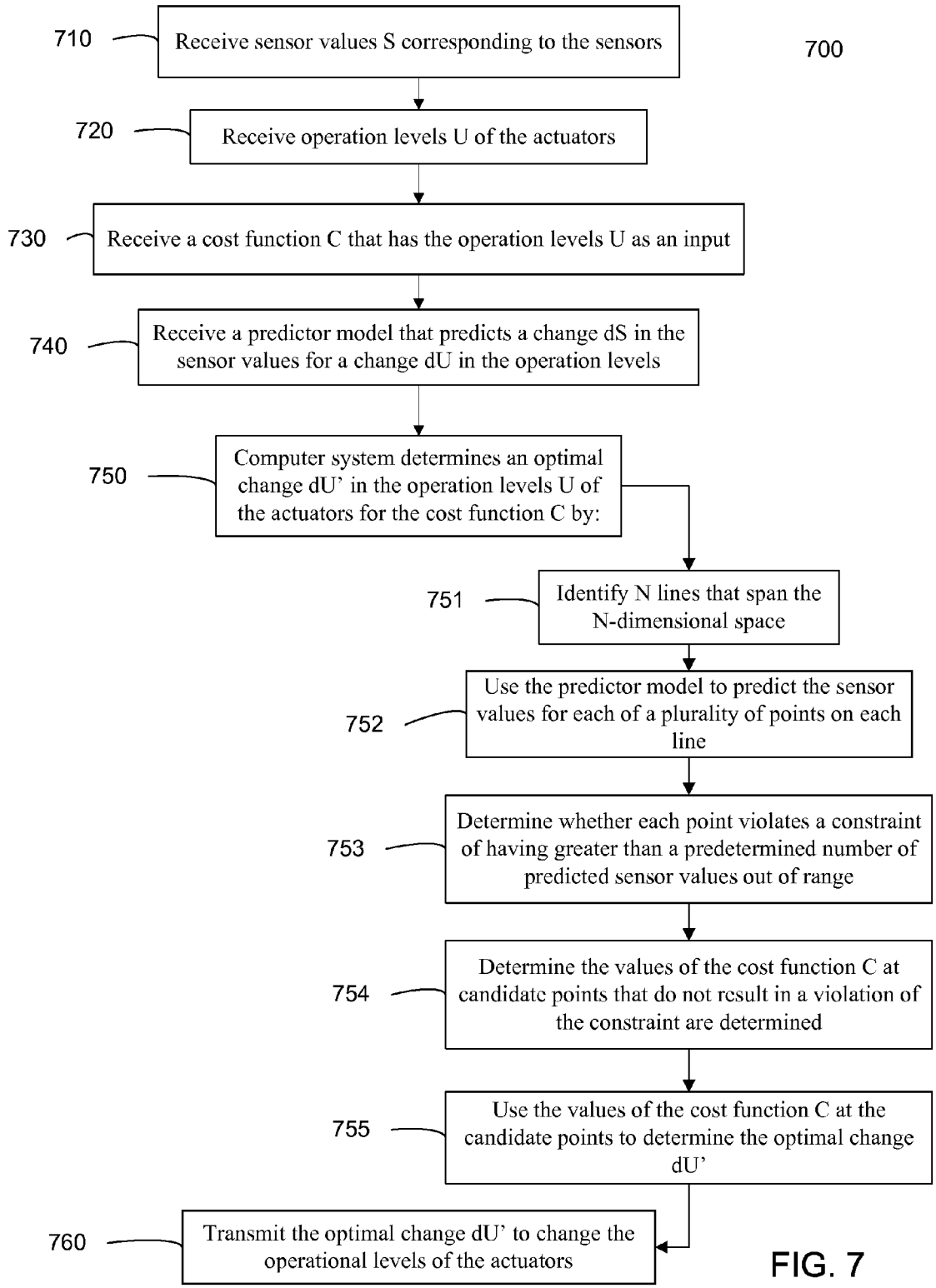
FIG. 7 is a flowchart illustrating a method 700 for controlling an environmental maintenance system that includes a plurality of actuators and a plurality of sensors according to embodiments of the present invention.

FIG. 7 is a flowchart illustrating a method 700 for controlling an environmental maintenance system that includes a plurality of actuators and a plurality of sensors according to embodiments of the present invention. Each sensor measures a value of a physical condition of an environment. As with other methods described herein, method 700 can be implemented using a computer system, e.g., supervisory controller 15. Embodiments of the optimization method described below may be used in step 430 of method 400 and step 530 of method 500.

In step 710, sensor values S corresponding to the sensors are received. There may be a multitude of sensors and associated sensor values. Embodiments can be particularly advantageous when the number of sensors is larger than the number of controls. Each sensor can have a desired range of sensor values. This range can be the same for all of the sensors or the ranges can vary. The ranges can be open-ended or close-ended.

The ranges can be used as optimization constraints imposed on the allowable range of each sensor value. A number of out of range sensor values may be allowed in some embodiments. In one example, a typical constraint defines what temperature a temperature sensor in a data center may not exceed, in order to protect temperature-sensitive equipment from over-heating. A constraint could also limit how low a temperature may fall in order to prevent undesirable condensation or freezing conditions. Rules can be imposed to allow constraint violations. For example, one may choose to ignore temperature constraint violations on the hottest few temperature sensors based on the reasoning that these represent hot spots in a data center that cannot be cooled effectively in an energy-efficient manner (and are better handled with design changes on the data center floor).

In step 720, operation levels U of N actuators are received, where N is an integer of at least two. The possible values for the operation levels U define an N-dimensional space. For example, if there are 100 actuators, then the operational levels U can define a 100-dimensional space for the control values between the respective minimum and maximum values of each actuator. The number N of actuators may be less than the total number of actuators in the system. Thus, a system may have N+2 actuators, but the optimization may only be performed on N actuators.

In step 730, a cost function C that has the operation levels U as an input is received. To implement a constraint regarding the sensor value ranges, the cost function can be viewed as being constrained by these sensor ranges. For example, the cost function could be defined to have an infinite or very large value if greater than a specified number (e.g., greater than 0 or greater than 5, or any other integer) of sensors are predicted to be out of range. Such constraints may be considered hard constraints as they effectively forbid the use of operation levels that violate the constraint. If the specified number is greater than 0 (e.g., 3), then a soft constraint may be used to penalize the out of range condition for one to three sensors for a given operation levels U0, but still allow the use of U0.

A reason for allowing a specified number of sensors to be out of range is that a system may have units configured in such a way that certain sensors cannot be kept in range. One may want to completely ignore those sensors and not include them in the optimization method (e.g. if the sensors are already known, those sensors may be excluded). If specific sensors are not known, a hot spot of a certain size could be permitted by allowing some (i.e. the specified number) of sensors to be out of range. The specified number of sensors can be determined dynamically as the system is running or may be constant for the operation of the system.

In step 740, a predictor model that predicts a change dS in the sensor values for a change dU in the operation levels is received. The predictor model may be of various types as is described above. For example, the predictor model may be a transfer matrix, whose matrix elements can be determined as described above. In one embodiment, the predictor model can predict the sensor values for any control value combination. A simple predictor comprises a linear mapping (e.g. a matrix) between a controls change and a predicted temperature change in response to this controls change, where the changes occur relative to a current set of conditions. Other (e.g., nonlinear predictors) can be used as well.

In step 750, a computer system determines an optimal change dU' in the operation levels U of the actuators for the cost function C. The optimal change dU' can account for any constraint criteria, e.g., a requirement that fewer than a specified number of sensor values are out of range. The optimal change dU' can be determined as follows.

In step 751, N lines are identified in the N-dimensional space. The N lines span the N-dimensional space. The N lines can all be orthogonal to each other, but this is not required. The N lines also can all intersect at the same point, but again this is not required. The lines can be of different lengths, which can correspond to different minimum or maximum operation levels, or corresponding to a minimum and maximum allowed change from the current operation levels U. When the lines are orthogonal, one embodiment can have the lines be along the control values of just one actuator each. In such an embodiment, changing a position on a line only changes the operation level of the one actuator. More than N lines may be used, and the use of N lines does not prohibit the use of more lines, which can add some redundancy to the space spanned by the N lines.

Fewer lines can be used if necessary if it is a priori known, or assumed, that no better solution exists in an excluded direction. This could be the situation if a particular line has been checked for better solutions prior to step 751 and the intersection of all lines has been deliberately placed at the best location along that particular line. Excluding directions prevents backtracking over previously optimized solutions from previous optimization steps. Such a use of fewer lines effectively constitutes a reduction in the number of actuators, and thus may simply be viewed as a change in the value of N.

In step 752, the predictor model is used to predict the sensor values for each of a plurality of points on each line. Each point corresponds to a different set of N input values, i.e., operation levels for the actuators. The different points can be chosen in various ways. For example, the points can be chosen periodically along a line (e.g. 11 points can be used, starting from one end of the line, with the last point at the other end of the line). The points to be sampled for a line can also be located at uneven locations on the line, and may even be chosen at random. The sample points may include the end points of the lines.

Where a line corresponds to the operation levels of a particular actuator, and the operation levels are discretized, all of the possible operation levels can be sampled. Where a line is not parallel to any one control, no point on that line may represent a set of coordinates in the control space if the controls are discrete and not continuous. In that case, one could use a scheme to associate line points with nearby discrete control values.

In step 753, it is determined whether each point violates a constraint of having greater than a specified number of predicted sensor values out of range. The points that do not violate the constraint are considered candidate points. For a sensor constraint, the predictor can define multidimensional sections in the N-dimensional space where that constraint is violated, or not violated, by a selected combination of control values. Because a practical data center application can have a very large number of temperature sensors (e.g., many hundreds), the associated constraints can carve out a multidimensional portion of the control optimization space that has an extremely complex shape. The shape can be further complicated if rules for allowed constraint violations are included. In most practical applications involving large data center installations, the shape is far too complicated to be explicitly determined.

In step 754, the values of the cost function C at candidate points that do not result in a violation of the constraint are determined. In one embodiment, the optimization method evaluates the cost function at candidate points (operation levels) where fewer than the specified number of constraints are violated and does not use penalty contributions of individual constraint violations (e.g., $P_S$ described above) to the cost function. This has an important advantage that all possible partial contributions of each control U to the cost can be pre-computed in a lookup table, and the cost at a particular coordinate then can be effectively calculated as the simple sum of values from the lookup table. The cost then does not depend on additional cost components that become available only after the evaluation of specific constraint conditions.

In step 755, the values of the cost function C at the candidate points are used to determine the optimal change dU'. The values for the candidate points may be used in various ways. For example, the candidate point $U_L$ with the lowest cost value can be chosen. In one embodiment, this lowest cost point O' can be used as the basis for a further search. For example, N new lines can be created with point O' at the intersection of these new lines. These N new lines can be searched in a similar manner to identify a set of candidate points and to determine an optimal candidate point for the new set.

The term optimal solution (i.e. dU') includes near-optimal solutions in a sense that the optimization cost is minimized (e.g. within a specified criteria) in a local neighborhood in the optimization space along searched directions and that all constraints are satisfied with the possible exception of allowed constraint violations (e.g. a specified number of sensors being out of range). A further selection step can select a best solution among the near-optimal solutions of the optimization method. To select between similar near-optimal solutions of the optimization problem, the selection step can use the same cost criterion or it can use other criteria, such as how close a predicted near-optimal solution is to the current state of the controls.

In step 760, the optimal change dU' is transmitted to change the operational levels of the actuators. The optimal change dU' may be transmitted from the computer system to an actuator, which may be via an intermediate device. The optimal change dU' may be used to determine the new input value Unew with the equation: Unew=U+rho*dU, which may be calculated by the computer system or some intermediate device. To ensure that Unew does not violate a constraint, embodiments can use the predictor model to determine whether Unew does violate the constraint. For example, several values of rho can be checked, and the allowable values may be used to determine which rho to use. In one implementation, Unew=U+dU may be used if there is no guarantee that Unew does not violate constraints for any rho other than one.

In one embodiment, the optimal change dU' may be represented by the $U_L$ of the candidate point with the lowest cost (e.g., where rho equals zero), where $U_L$ can be sent as new control values. Thus, the optimal change dU' can encompass $U_L$, and the transmission of dU' can encompass the transmission of $U_L$.

The disclosed optimization method has a number of advantages over other optimization methods known in the art. Some embodiments also have a distinguishing advantage that they emphasize constraints over cost, and that the relative cost between control values is preferably implicitly represented by an ordering of those control values according to their cost along one of the N lines.

The application of the optimization method is not restricted to data centers but can be used in other situations as well, such as in air-conditioning of buildings, or for other purposes, such as humidity control, etc. Control inputs to the AHUs are device specific and can include air or water inlet or outlet temperature set points, chiller water valve position, fan speed, and others. Many types of air-handling units are known and the optimization method is not restricted to any one of them.

B. Candidate Points for N=2

An example is described with reference to the figures that follow. The N-dimensional optimization space is spanned by N control values U1, U2, . . . , UN, where U1 corresponds to a first actuator, U2 corresponds to a second actuator, and so on. These U1-UN can be considered a Cartesian coordinate system of N-dimensions. For ease of illustration of the general optimization problem and without loss of generality, an example using only U1 and U2 is now described.

Figure 8:
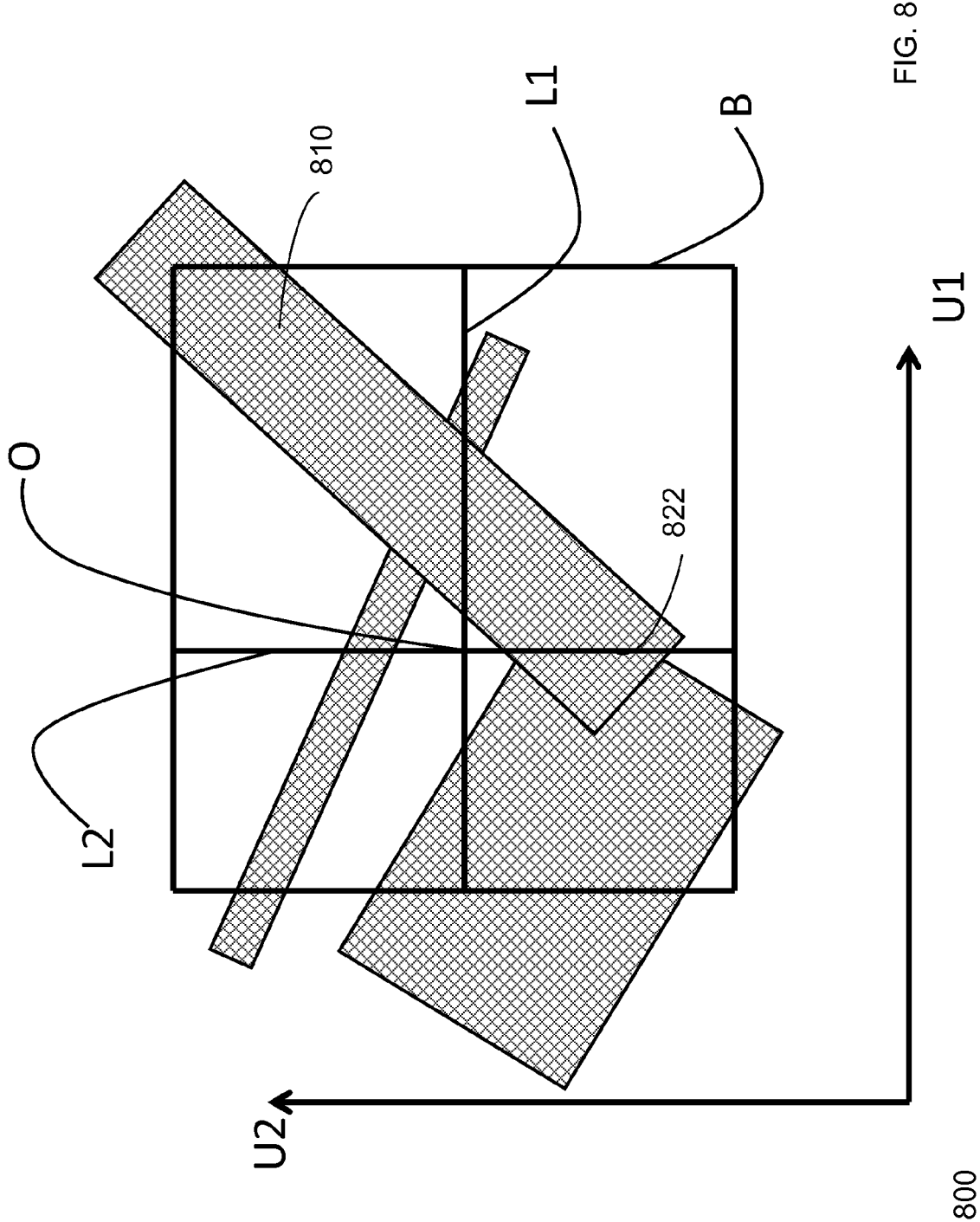
FIG. 8 is a diagram showing an example optimization method for the case N=2 according to embodiments of the present invention.

FIG. 8 is a diagram 800 showing an example optimization method for the case N=2 according to embodiments of the present invention. A bounding box B limits the allowable range of control values. In this example, the optimization method is only allowed to select points from within this box. In various implementations, the bounding box can correspond to minimum and maximum control values for each actuator or minimum and maximum change in the control values for each actuator (e.g., so as not to disturb the system too much from a current set of control values).

A predictor model (also called a predictor algorithm) provides the predictive computation of expected sensor values for each combination of control values, e.g., as described herein. For a given value of U1,U2 (a set of two coordinates for a point in diagram 800), the predictor model can be used to determine how many sensor values are predicted to be our of range, and thus may violate a constraint. If this sensor prediction violates constraints (e.g., where a certain number of sensor values may be allowed to be out of range), the corresponding point in the control space cannot be a near-optimal solution, and thus is not a candidate point. For the purpose of illustration, violation regions of points violating constraints have been crosshatched in FIG. 8. In practical applications, such regions 810 can be arbitrarily complex.

Accordingly, point O in the diagram can be a candidate point since it is not within one of crosshatched regions 810. However, point 822 would violate the constraint, and thus not be a candidate point. The lines L1 and L2 are discussed below regarding an embodiment of the optimization.

C. Determining New U

In one embodiment, the multidimensional space of N control values can be searched for a new U ($U_{New}$). The search can be constrained to N-dimensional points that satisfy the constraint(s) on the predicted sensor values. The $U_{New}$ can provide or be used to provide the optimal dU, e.g., as the difference between the old U ($U_{Old}$) and $U_{New}$.

Figure 9:
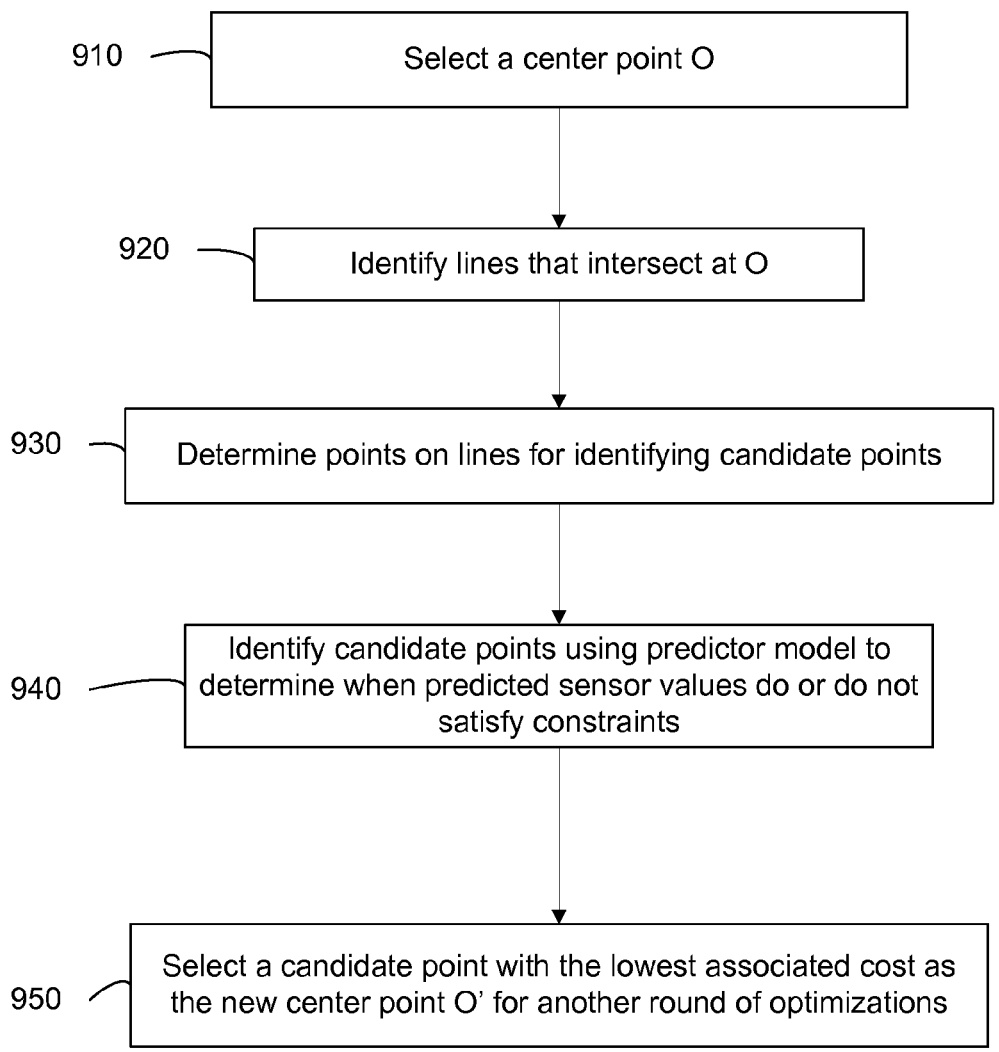
FIG. 9 is a flowchart of a method 900 for determining an optimal setting for control values U according to embodiments of the present invention.

FIG. 9 is a flowchart of a method 900 for determining an optimal setting for control values U according to embodiments of the present invention. Method 900 may be used in embodiments of method 700.

In step 910, a center point is selected (e.g., point O in FIG. 8). The point does not necessarily have to be the center of any bounding box, but can be considered a center point in the sense that searches are made along lines that intersect at the center point. For example, point O can be selected as a center point in the optimization space. The center point O is shown as lying inside the box B in FIG. 8 but it does not have to be. That is, the center point could be outside bounding box B. However, selecting a center point inside bounding box B can make the optimization computationally more efficient by searching more control values that are allowed (i.e., not outside a maximum or minimum).

In various embodiments, the center point O can be chosen as a current setting for the actuators (i.e. the current operation levels U) or chosen at random. In one implementation, the center point is determined by selecting a value for each control at random, e.g., with a uniform distribution. The center point O can also be the result of a previous optimization by any optimization method. As another example, a coarse grid can be chosen and the grid points can be sampled to identify candidate points, and then an optimal candidate point can be selected based on the values for the cost function. This optimal candidate point can then be used as O. In general though, the center point O does not have to satisfy any of the constraint conditions.

In step 920, lines that intersect at O are identified. For example, lines L1 and L2 (also referred to as legs) of FIG. 8 can be identified. FIG. 8 illustrates portions of leg lines L1 and L2 that are located inside box B. In one embodiment, for reasons of algorithmic simplicity, each leg line is parallel to a principal coordinate axis, i.e. the points on the leg line share all but one coordinate with the center point O, but other leg lines such as multidimensional space diagonals could be used.

In step 930, points on lines are determined for identifying candidate points. A set of candidate points can be comparably easy to find if the available control values are discrete. Often the control values are already discretized due to digital control. In other instances, the control values can also be deliberately discretized. The number of points can be determined based on a tolerance, e.g., as specified by a user, from a default, or determined dynamically based on other criteria, e.g., previous steps of the optimization method. The tolerance can specify how sparse or how dense the points are on a line. Thus, the optimization method itself can determine a sparse set of points on each leg line from which to select candidates.

In one embodiment, selecting a discretization scheme for control values can be guided by practical considerations. For example, the number of points that need to be checked for constraint violations might dictate a denser grid if many points violate the constraints. The smallest difference between two adjacent control values that makes a significant and discernible difference in the final result can be used as a criterion. What difference between two adjacent control values can be expected to make a discernible difference on the controlled environment is another example.

Figure 10:
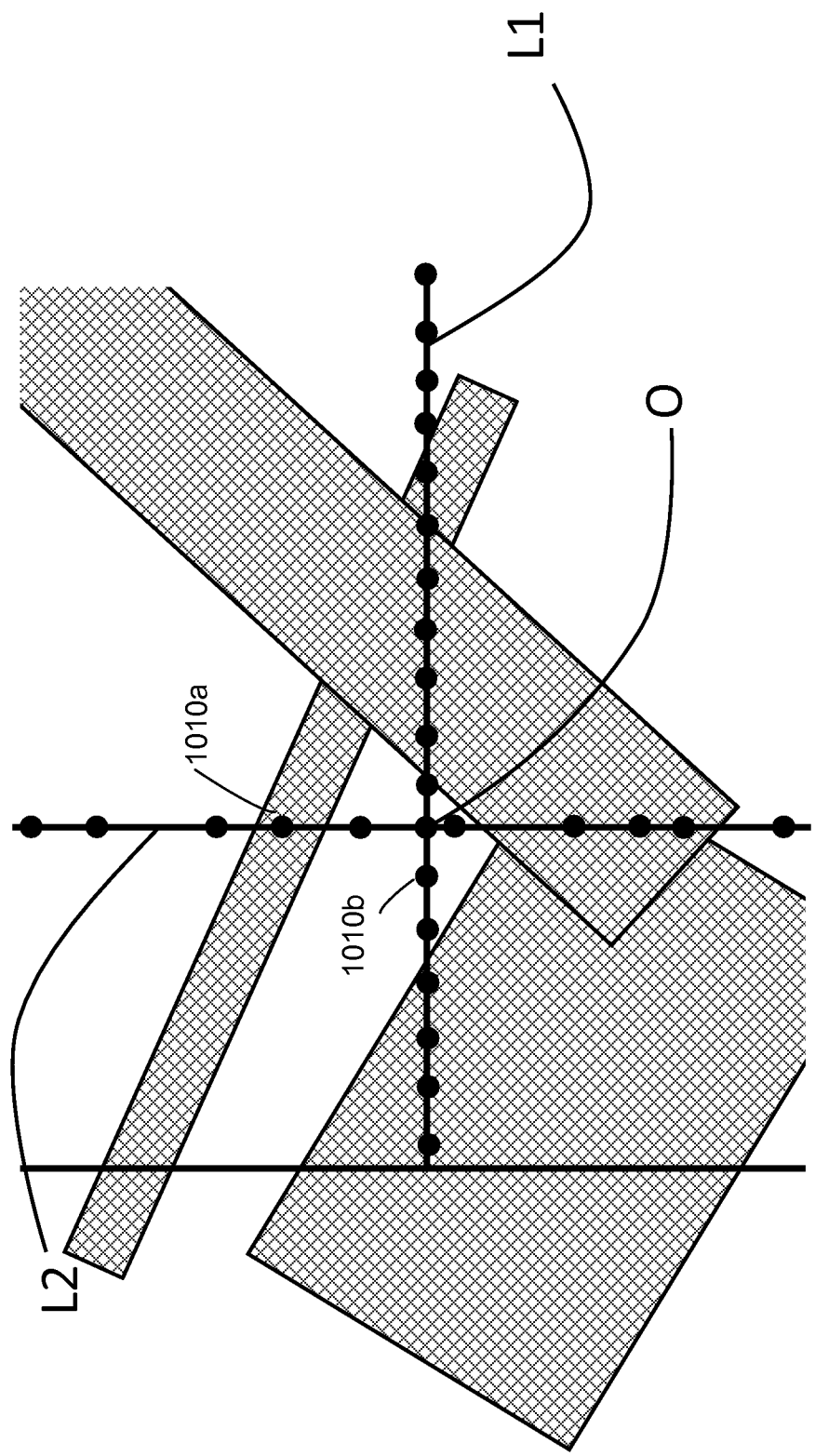
FIG. 10 illustrates a discretization scheme on legs L1 and L2 according to embodiments of the present invention.

FIG. 10 illustrates a discretization scheme on legs L1 and L2 according to embodiments of the present invention. The discretization scheme on leg L1 could have been produced by discrete fan speed settings on an AHU. Leg L2 illustrates that the discretization, or gridding, does not have to be uniform. Only the portions inside the bounding box B of FIG. 8 are shown in FIG. 10 for simplicity. Center point O may or may not be a candidate point. Sample points 1010 correspond to the points determined from the discretization scheme.

In step 940, the predictor model is used to identify candidate points where the predicted sensor values satisfy the constraint(s). For each 'leg' line L1, L2, . . . , LN through center point O, it can be determined which portions of the leg line satisfy all conditions and all rules for allowed constraint violations. All points in these portions are candidates for a better solution than center point O.

In FIG. 10, all points on the leg lines that are not inside the crosshatched areas are candidates for a better solution than center point O. Sample points 1010 can be used to search for points that satisfy the constraint criteria. The sample points 1010a that violate the constraint (e.g., by having too many predicted sensor values outside of a desired range) are shown as being within the cross-hatched area. The sample points 1010b that do not violate the constraint can then be identified as candidate points for searching to find an optimal candidate point.

In some embodiments, once a sample point is found to violate a constraint, then further points in one direction along the leg line that the sample point belongs to can be considered also to violate the constraints. Thus, these further points do not need to be sampled. For example, if the line is along the operation levels of one actuator, it can be assumed that reducing the operation level would also cause a sensor to be too hot. The converse can be true if the sensor is desired to not be too cold, and both true if the desired sensor range is close-ended with the sensor value being between two set points. FIG. 10 shows more complex regions of violation to illustrate that a line can have more than one coherent region where constrains are violated, or are not violated.

In step 950, a candidate point with the lowest associated cost is selected as the new center point O' for another round of optimizations. This step can involve comparing the costs associated with each candidate point with each other and selecting a candidate point with the lowest associated cost as the new center point O' for another round of optimizations. If several candidate points have the same associated cost (where same can allow some variance within a threshold), various options may be used to select one from this group. For example, one point could be selected at random from the group as a new center point O'. One could also select all points of the group as individual center points O' and branch off from them with separate optimization threads.

In another implementation, the cost function could be modified by adding another term (e.g. one described herein). Thus, the initial cost function could account only for power usage, and then once a group of candidate points were identified that have a same or similar associated cost for the initial cost function, the maintenance cost can be added or simply analyzed on its own (since the groups of points are known to be equal or almost equal for the other terms). This additional term can then be used to discriminate between points in the group of candidate points that were equal for the initial cost function. Another criterion to select among points in the group can be based on how far away that point is from the current operation levels U (which could be part of the cost function) or other values of distance (e.g. the one with a smallest maximum change for any one actuator).

The optimal candidate point from a current set of candidate points does not have to be the one with the lowest cost. One could also apply a rule to select as new center points O' candidate points that have not the least associated cost among the candidate points, but maybe the second-lowest cost. Such a candidate point is still satisfying a criterion, namely being the second-lowest cost.

D. Selection Process

Figure 11:
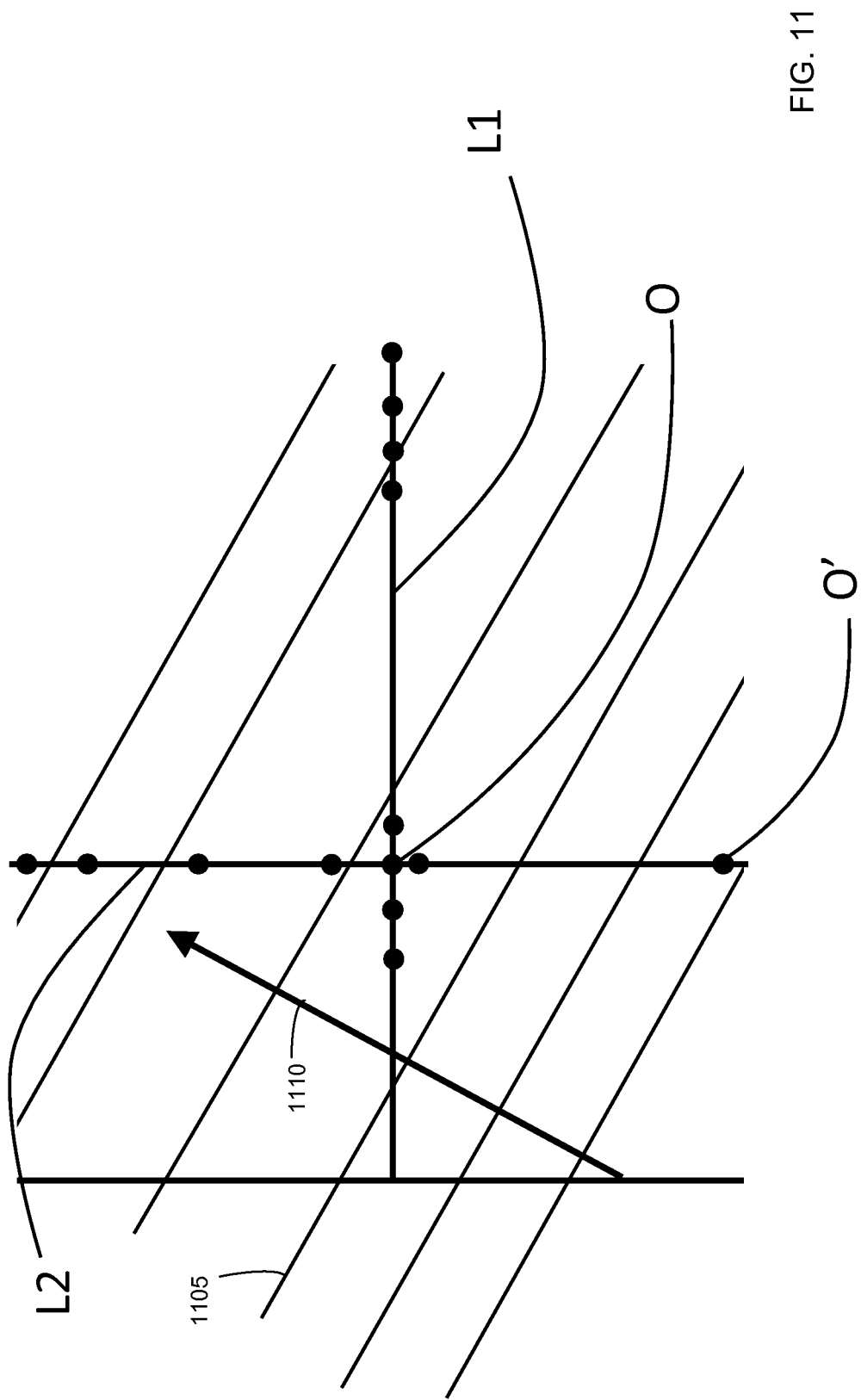
FIG. 11 illustrates a process for selecting an optimal point among the candidate points according to embodiments of the present invention.

FIG. 11 illustrates a process for selecting an optimal point among the candidate points according to embodiments of the present invention. Only the candidate points on the leg lines from FIG. 10 are shown. Note that the points that fell within the violation regions are not displayed. Diagonal contour lines 1105 illustrate exemplary levels of a cost function that increase along the direction of the arrow 1110.

In some embodiments, the cost of a candidate point can be efficiently computed from the cost of the center point O when a candidate point and the center point O have identical coordinates except one that is different. In this case, the candidate cost can be obtained by first subtracting the partial cost of center point O that is associated with that different coordinate and then adding the partial cost of the candidate control value that is associated with that different coordinate. For example, the cost for candidate point O' can be determined in this manner, where the different coordinate is U2, which corresponds to leg L2.

An improvement in execution efficiency can be achieved if the discrete control values along a leg line are checked for constraint violations in order of increasing associated cost (this ordering can be known if the cost contributions of each control U are pre-computed into a lookup table). Then, if a control value is found that satisfies all constraints and allowed exceptions, further search along that leg line can be suspended since that control value already represents the candidate point with the least cost on that leg line. In this manner, at most one candidate point per leg line is determined. That candidate point can be the center point O itself or a point with a smaller associated cost. If each leg line results in exactly one candidate point that is center point O, then center point O is the final near-optimal result of the search.

In the example of FIG. 11, candidate point O' has the lowest associated cost. Once optimal candidate point O' is identified, a new set of N lines can be created and searched, as is mentioned above with respect to this new point O' Before creating these N new lines or before considering the optimal candidate as a final optimal candidate for this particular optimization, a search can be refined around O'. For example, smaller discretized steps can be used to sample points near O', that is closer than the previous sampling to determine O'. The cost values at these refined points can then be used to determine a new optimal candidate point, which may be used to determine the N new lines.

Embodiments can use multiple starting points O, and then run independently to obtain a final candidate point for each run. The final candidate points can be used to determine an optimal change dU. For example, the final candidate point with the lowest associated cost can be selected from the group. In this manner, a global minimum can be searched to some extent. The various starting points can be determined via the grid example above, where a coarse grid is sampled to determine candidate points, which all may be used as starting points for independent optimizations or certain points may be selected (e.g. based on associated cost value). A coarse grid has relatively few grid points relative to the total number of possible points, e.g., a coarse grid with only three grid points per dimension when the total number of possibly points is 100 for each dimension.

E. Finding Point with Fewest Violations

Figure 12:
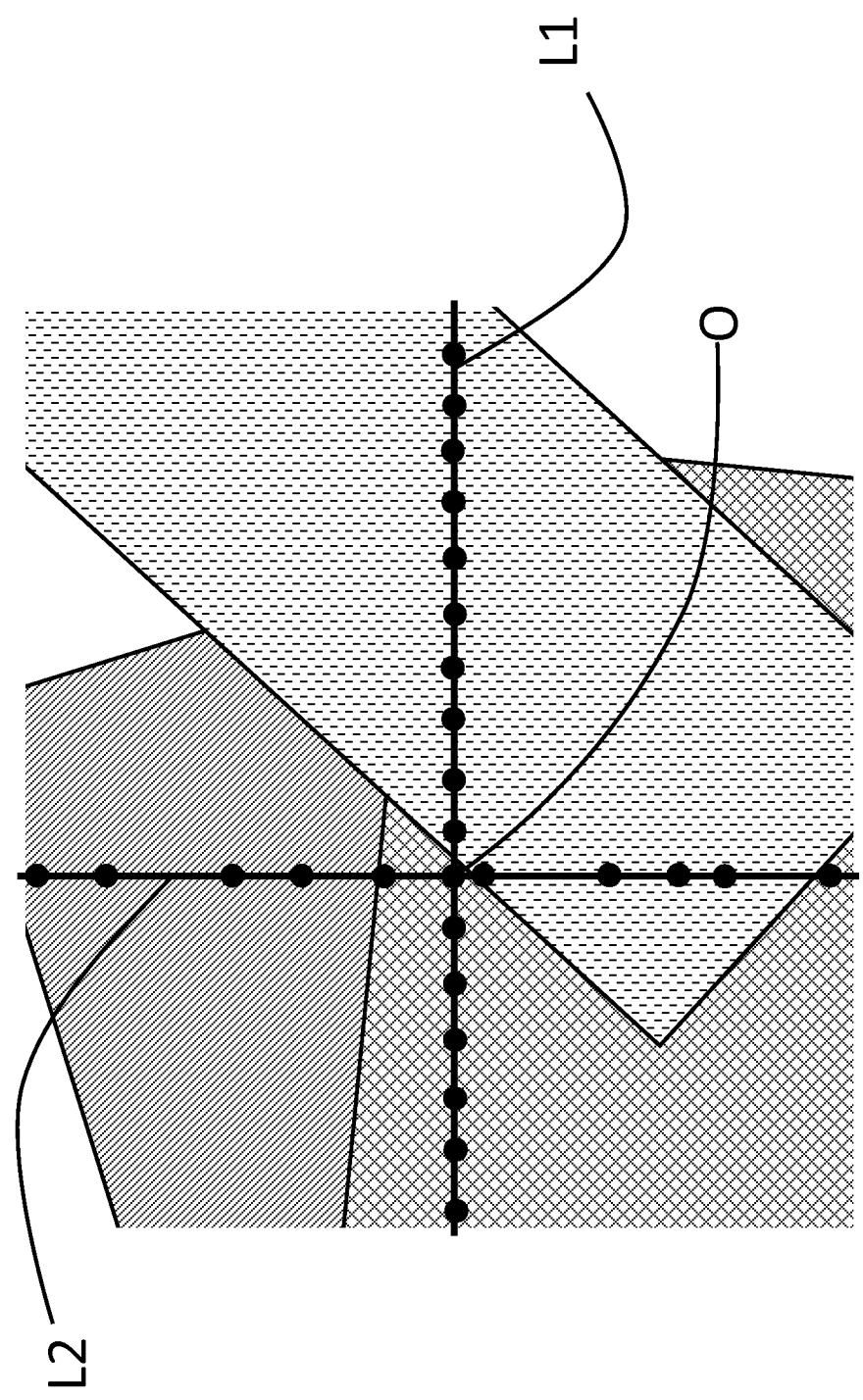
FIG. 12 illustrates an example where there are no candidate points on any leg lines that satisfy the imposed constraints according to embodiments of the present invention.

If no point O' can be found that is better, i.e., has a lower cost, than the center point O, then the center point is a desired near-optimal result of the procedure unless center point O itself violates constraints (in which case center point O was not a candidate point). Such a situation is illustrated in FIG. 12. Here, overlapping and differently shaded regions indicate control value combinations that result in the violation of a specific number of constraints (minus any rules that allow for constraint violations). The number of constraint violations is a preferred measure of constraint violation severity but other measures can be used too.

In the situation of FIG. 12, there are no candidate points on any of the selected leg lines that satisfy the imposed constraints. In one embodiment of the optimization method, the search for better points is aborted here and a new search is started using a new initial center point O. However, such a process may be inefficient. For example, if the volume of the space of points that could potentially become candidate points (i.e. points that do not violate constraints) is much smaller than the volume of the space of points that cannot be candidate points (due to constraint violations at those points), then too many attempts with initial center points O would fail, which results in a computationally inefficient algorithm. On the other hand, if the volume ratios are reversed, the optimization method disclosed so far can be quite efficient in practice.

In some implementations, the volume ratio (comparison of volumes described above) can be inferred. One method to infer the volume ratio is by counting the successful and unsuccessful outcomes of random trials (i.e., tests of candidate points) and then taking their ratio of these counts. This ratio is a measure of how severely constrained the corresponding optimization problem is. In general, this ratio cannot be determined a priori, and thus is often not a very useful measure for planning a computational time budget for a particular optimization problem.

In one embodiment, instead of aborting the search when no candidate points on any of the leg line can be found, it is advantageous to advance the search by picking one or more points on the leg lines as new center points for the next optimization step. A method of picking such a point is to select a point with the least constraint violation severity (e.g., the fewest number of predicted sensors values that are out of range). If several points have the same least severity, one of these can be selected at random. In one implementation, if center point O is not a candidate point, and no points on the leg lines are candidate points, and if no point on the leg lines has a lesser constraint violation severity than the center point O, then the current search can abort without result in order to prevent indeterminately long search times. A new center point could be chosen to start a new search.

Once a point $O_L$ with the least severity is found, this point can be used as new input for the system, even though it violates the constraint criteria. In another implementation, the point of least severity is used to create N new lines, e.g., with N orthogonal lines intersecting at point $O_L$. A process, e.g., of methods 700 and/or method 900, can then proceed by analyzing points on the N new lines in search of a point that does not violate the constraint criteria. Even if a candidate point is not found, a point with less severity than $O_L$ might be found. In this manner, a process similar to finding a candidate point with an optimal cost function value can be used to find a candidate point with the least constraint severity.

F. Results

Experiments have shown that the optimization method of finding points with fewest violations (e.g., fewest predicted sensor values out of range) creates a sequence of center points that 'climb' out of the constraint violation regions along a path of decreasing violation severity until at least one candidate point can be found that does not violate constraints (minus rules for allowed constrained violations). From that point on, the optimization search can progress as before along a path of decreasing cost. Even for highly constrained optimization problems that have practically zero probability of selecting a center point O at random that has leg lines on which candidate points can be found, the method of 'climbing' along a path of reduced constraint severity can improve the chance of resulting in a near-optimal result to practical values.

Accordingly, in some embodiments, each initial center point O will thus result in a sequence of subsequent points O'1, O'2, etc., each itself a new center point, that will eventually stop at a final near-optimal result. Many such sequences with different initial center points can be computed, and their final near-optimal results can be compared to determine a best solution among them to be used in further proceedings (e.g., selecting a best one).

In one aspect, it can be advantageous to record the direction, or leg line, from which the new point O' was obtained from the center point O. When checking new leg lines from the new center point O', the one leg line that coincides with the previous direction can be omitted in order to avoid backtracking and also in order to save a small amount of computational time. In this situation, the actually searched leg lines do not span the control space fully. In such a case, the search space has been decreased to N−1 dimensions, and the N−1 leg lines would span the N−1 space.

Some embodiments determine a specified amount of time (e.g., based on system parameters of how often an update is requested) to determine the optimal dU. It can be beneficial to use the allotted amount of computational time to attempt as many initial center points O as possible to arrive at as many near-optimal solutions in that time as possible, thereby improving the likelihood of finding ever better solutions of practical use.

When the initial center point is randomized, an estimated cumulative cost distribution function of all resulting near-optimal solutions for a certain number of initial center points can be used to estimate the probability that another attempt with a new random initial center point will result in a yet better solution with less cost. This estimate can be compared with an available optimization time budget to decide if more optimization attempts are worth the extra computational effort.

For monotonic cost functions, it has been observed that the sequence length from initial center point to final near-optimal result is on the order of the number of controls when averaged over many sequences, and often half that number. It can be useful to time the total computational duration of a number of attempts in order to estimate how many attempts will fit into a given computational time budget, as mentioned above. Alternatively, since every sequence executes very fast on a computer, one can keep attempting sequences and checking a timer after a specified number of attempts until a given computational time budget for the optimization has been used up. This is an advantage over other optimization methods such as Nelder-Mead where generally no a-priori estimate can be made for the duration of an optimization sequence until a near-optimal solution is found where the optimization algorithm can find no better solution. The terms 'better' or 'best' can refer to a lower measure of cost or a lower measure of constraint severity, depending on the situation.

The disclosed optimization method can also be applied to problems where a cost is not to be minimized but is maximized instead. In this case, each cost can simply be replaced by its negative value to turn the maximization problem into a minimization problem.

V. Computer System

Figure 13:
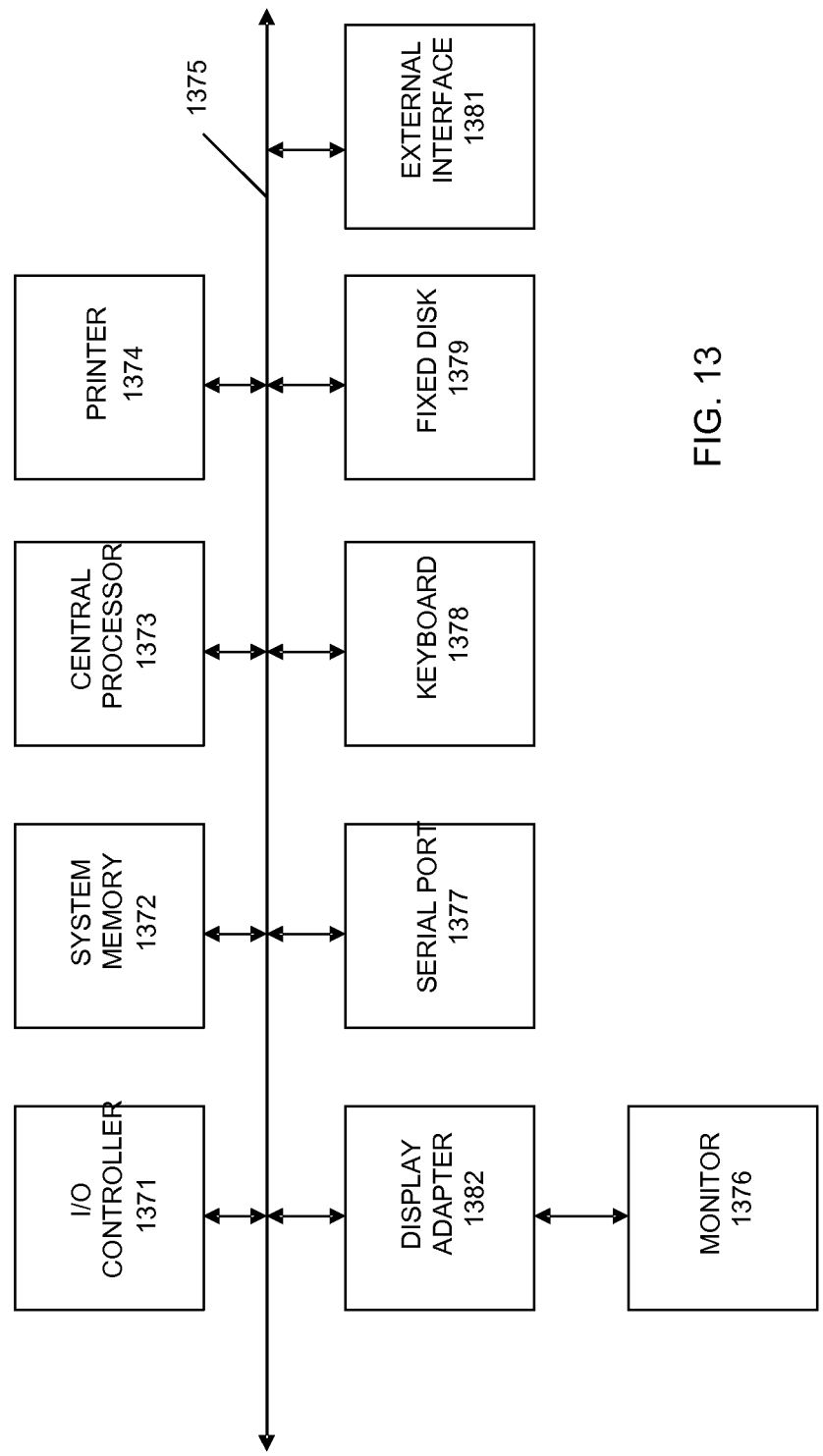
FIG. 13 shows a block diagram of an exemplary computer apparatus usable with system and methods according to embodiments of the present invention.

Any of the computer systems mentioned herein may utilize any suitable number of subsystems. Examples of such subsystems are shown in FIG. 13 in computer apparatus 1300. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 13 are interconnected via a system bus 1375. Additional subsystems such as a printer 1374, keyboard 1378, fixed disk 1379, monitor 1376, which is coupled to display adapter 1382, and others are shown. Peripherals and input/output (I/O) devices, which couple to I/O controller 1371, can be connected to the computer system by any number of means known in the art, such as serial port 1377. For example, serial port 1377 or external interface 1381 (e.g. Ethernet, Wi-Fi, etc.) can be used to connect computer system 1300 to a wide area network such as the Internet, a mouse input device, or a scanner. The interconnection via system bus 1375 allows the central processor 1373 to communicate with each subsystem and to control the execution of instructions from system memory 1372 or the fixed disk 1379, as well as the exchange of information between subsystems. The system memory 1372 and/or the fixed disk 1379 may embody a computer readable medium. Any of the values mentioned herein can be output from one component to another component and can be output to the user.

A computer system can include a plurality of the same components or subsystems, e.g., connected together by external interface 1381 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including a processor, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method of controlling an environmental maintenance system that includes a plurality of actuators and a plurality of sensors, each sensor measuring a value of a physical condition of an environment, the method comprising:
receiving sensor values S corresponding to the sensors, a desired range of sensor values being specified for each sensor;
receiving operation levels U of N actuators, N being at least two, and wherein possible values for the operation levels U define an N-dimensional space;
receiving a cost function C that has the operation levels U as an input;
receiving a predictor model that predicts a change dS in the sensor values S for a change dU in the operation levels U;
determining, with a computer system, an optimal change dU' in the operation levels U of the N actuators by:
identifying N lines in the N-dimensional space, wherein the N lines span the N-dimensional space;
for each of a plurality of points on each line:
using the predictor model to predict the sensor values for the point; and
determine whether the point violates a constraint of having greater than a specified number of predicted sensor values out of range; and
determining cost values of the cost function C at candidate points that do not result in a violation of the constraint; and
using the cost values of the cost function C at the candidate points to determine the optimal change dU'; and
transmitting the optimal change dU' to change the operational levels U of the N actuators, thereby causing the N actuators of the environmental maintenance system to control the environment.

2. The method of claim 1, wherein the plurality of points are uniformly spaced on the N lines.

3. The method of claim 1, wherein using the cost values of the cost function C at the candidate points to determine the optimal change dU' includes:
determining a first optimal candidate point based on the cost values of the cost function C at the candidate points;
identifying N additional lines that intersect at the first optimal candidate point;
analyzing points on the N additional lines to determine a second optimal candidate point; and
repeating identifying of lines and determining other optimal candidate points until one or more criteria are satisfied.

4. The method of claim 3, wherein the one or more criteria are selected from a group including:
a change in value of the cost function C from one optimal candidate point to a next optimal candidate point; and
a time limit.

5. The method of claim 3, wherein determining a first optimal candidate point based on the cost values of the cost function C at the candidate points includes:
using a candidate point with a lowest cost value for the cost function C as the first optimal candidate point.

6. The method of claim 3, wherein transmitting the optimal change dU' comprises transmitting the operation levels U corresponding to a candidate point with a lowest cost value of the cost function C.

7. The method of claim 1, wherein the plurality of points on the N lines violate the constraint, the method further comprising:
determining a first point that causes a least number of predicted sensor values to be out of range;
identifying N additional lines that intersect at the first point;
analyzing points on the N additional lines to identify any candidate points that do not result in a violation of the constraint;
if candidate points are identified, using the cost values of the cost function C at the candidate points to determine the optimal change dU'; and
if candidate points are not identified, repeating determining of a point that causes the least number of predicted sensor values to be out of range, identifying N other lines, and analyzing points on the N other lines until one or more candidate points that do not result in a violation of the constraint are found or a limit is reached.

8. The method of claim 1, wherein using the cost values of the cost function C at the candidate points to determine the optimal change dU' includes:
   identifying a group of candidate points with a same value for the cost function C;
   evaluating a value of a new cost term for each of the group of candidate points, thereby obtaining new values for the new cost term; and
   using the values for the new cost term to determine the optimal change dU'.

9. The method of claim 1, wherein identifying N lines in the N-dimensional space includes:
   selecting a point O; and
   selecting the N lines such that the N lines intersect each other at the point O.

10. The method of claim 9, wherein the point O corresponds to the operation levels U.

11. The method of claim 9, wherein the N lines are selected to be orthogonal to each other.

12. The method of claim 11, wherein each line is directed along a changing operation level of only one actuator.

13. The method of claim 12, wherein using the cost values of the cost function C at the candidate points to determine the optimal change dU' includes:
   determining a first optimal candidate point based on the cost values of the cost function C at the candidate points, wherein the first optimal candidate point is along a line corresponding to a first actuator;
   identifying N−1 additional lines that intersect at the first optimal candidate point, wherein the N−1 additional lines do not include a line corresponding to changing operation levels of the first actuator;
   analyzing points on the N−1 additional lines to determine a second optimal candidate point; and
   repeating identifying of lines and determining other optimal candidate points until a criteria is satisfied.

14. The method of claim 1, further comprising:
   identifying a bounding box, wherein the plurality of points on the N lines are chosen to be in the bounding box.

15. The method of claim 1, wherein the specified number of predicted sensor values allowed to be out of range is zero.

16. The method of claim 1, wherein the specified number of predicted sensor values allowed to be out of range is a non-zero integer less than or equal to five.

17. The method of claim 1, wherein the N lines intersect at a same point.

18. The method of claim 1, wherein a desired range is the same for each sensor value.

19. The method of claim 1, wherein a cost value of the cost function C at a point comprises a plurality of contributions, each corresponding to a different actuator, wherein determining the cost values of the cost function C at a particular candidate point includes:
   for each actuator:
      accessing a table to determine a contribution of an operation level of the actuator for the particular candidate point, the table including a value for a plurality of operation levels for the actuator.

20. A method of controlling an environmental maintenance system that includes a plurality of actuators and a plurality of sensors, each sensor measuring a value of a physical condition of an environment, the method comprising:
   receiving sensor values S corresponding to the sensors, a desired range of sensor values being specified for each sensor;
   receiving operation levels U of N actuators, N being at least two, and wherein possible values for the operation levels U define an N-dimensional space;
   receiving a cost function C that has the operation levels U as an input;
   receiving a predictor model that predicts a change dS in the sensor values S for a change dU in the operation levels U;
   determining, with a computer system, an optimal change dU' in the operation levels U of the N actuators by:
      identifying N lines in the N-dimensional space, wherein the N lines span the N-dimensional space;
      for each of a plurality of points on each line:
         using the predictor model to predict the sensor values for the point; and
         determine whether the point violates a constraint of having greater than a specified number of predicted sensor values out of range, wherein the plurality of points on each line violate the constraints;
      determining a first point that causes a least number of predicted sensor values out of range; and
      using the first point to determine the optimal change dU'; and
   transmitting the optimal change dU' to change the operational levels U of the N actuators, thereby causing the N actuators of the environmental maintenance system to control the environment.

21. The method of claim 20, wherein using the first point to determine the optimal change dU' includes:
   identifying N additional lines that intersect at the first point;
   analyzing points on the N additional lines to identify any candidate points that do not result in a violation of the constraint;
   if candidate points are identified, using cost values of the cost function C at the candidate points to determine the optimal change dU'; and
   if candidate points are not identified, repeating determining of a point that causes the least number of predicted sensor values out of range, identifying of N other lines, and analyzing points on the N other lines until one or more candidate points that do not result in a violation of the constraint are found or a limit is reached.

22. A computer product comprising a non-transitory computer readable medium storing a plurality of instructions that when executed control a computer system to control an environmental maintenance system that includes a plurality of actuators and a plurality of sensors, each sensor measuring a value of a physical condition of an environment, the instructions comprising:
   receiving sensor values S corresponding to the sensors, a desired range of sensor values being specified for each sensor;
   receiving operation levels U of N actuators, N being at least two, and wherein possible values for the operation levels U define an N-dimensional space;
   receiving a cost function C that has the operation levels U as an input;

receiving a predictor model that predicts a change dS in the sensor values S for a change dU in the operation levels U;

determining an optimal change dU' in the operation levels U of the N actuators by:

identifying N lines in the N-dimensional space, wherein the N lines span the N-dimensional space;

for each of a plurality of points on each line:

using the predictor model to predict the sensor values for the point; and determine whether the point violates a constraint of having greater than a specified number of predicted sensor values out of range; and determining cost values of the cost function C at candidate points that do not result in a violation of the constraint; and using the cost values of the cost function C at the candidate points to determine the optimal change dU'; and transmitting the optimal change dU' to change the operational levels U of the N actuators, thereby causing the N actuators of the environmental maintenance system to control the environment.

23. The computer product of claim 22, wherein using the cost values of the cost function C at the candidate points to determine the optimal change dU' includes:

determining a first optimal candidate point based on the cost values of the cost function C at the candidate points;

identifying N additional lines that intersect at the first optimal candidate point;

analyzing points on the N additional lines to determine a second optimal candidate point; and repeating identifying of lines and determining other optimal candidate points until a criteria is satisfied.

24. The computer product of claim 22, wherein the plurality of points on the N lines violate the constraint, the instructions further comprising:

determining a first point that causes a least number of predicted sensor values to be out of range;

identifying N additional lines that intersect at the first point;

analyzing points on the N additional lines to identify any candidate points that do not result in a violation of the constraint;

if candidate points are identified, using the cost values of the cost function C at the candidate points to determine the optimal change dU'; and if candidate points are not identified, repeating determining of a point that causes the least number of predicted sensor values to be out of range, identifying N other lines, and analyzing points on the N other lines until one or more candidate points that do not result in a violation of the constraint are found or a limit is reached.

25. The computer product of claim 22, wherein using the cost values of the cost function C at the candidate points to determine the optimal change dU' includes:

identifying a group of candidate points with a same value for the cost function C;

evaluating a value of a new cost term for each of the group of candidate points, thereby obtaining new values for the new cost term; and using the values for the new cost term to determine the optimal change dU'.

26. The computer product of claim 22, wherein identifying N lines in the N-dimensional space includes:

selecting a point O; and selecting the N lines such that the N lines intersect each other at the point O, wherein the N lines are selected to be orthogonal to each other, wherein each line is directed along a changing operation level of only one actuator, and wherein using the cost values of the cost function C at the candidate points to determine the optimal change dU' includes:

determining a first optimal candidate point based on the cost values of the cost function C at the candidate points, wherein the first optimal candidate point is along a line corresponding to a first actuator;

identifying N−1 additional lines that intersect at the first optimal candidate point, wherein the N−1 additional lines do not include a line corresponding to changing operation levels of the first actuator;

analyzing points on the N−1 additional lines to determine a second optimal candidate point; and repeating identifying of lines and determining other optimal candidate points until a criteria is satisfied.

27. An environmental maintenance system comprising:

the plurality of actuators;

the plurality of sensors; and the computer product of claim 22, wherein the computer product includes one or more processors communicably coupled with the non-transitory computer readable medium and configured to perform the instructions of claim 22.

* * * * *